United States Patent
Moon et al.

(10) Patent No.: US 10,814,220 B2
(45) Date of Patent: Oct. 27, 2020

(54) METHOD FOR CONTROLLING DISPLAY OF ELECTRONIC DEVICE USING MULTIPLE CONTROLLERS AND DEVICE FOR THE SAME

(71) Applicant: Samsung Electronics Co., Ltd., Suwon-si, Gyeonggi-do (KR)

(72) Inventors: Choon-Kyoung Moon, Suwon-si (KR); Hyun-Soo Nah, Seoul (KR); Hye-Jee Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 16/056,816

(22) Filed: Aug. 7, 2018

(65) Prior Publication Data
US 2019/0060742 A1 Feb. 28, 2019

(30) Foreign Application Priority Data
Aug. 29, 2017 (KR) .................. 10-2017-0109676

(51) Int. Cl.
| | |
|---|---|
| G09G 5/00 | (2006.01) |
| A63F 13/213 | (2014.01) |
| G06F 3/01 | (2006.01) |
| G06T 19/00 | (2011.01) |
| G02B 27/01 | (2006.01) |
| G06F 3/0484 | (2013.01) |
| G06F 3/038 | (2013.01) |

(Continued)

(52) U.S. Cl.
CPC .......... *A63F 13/213* (2014.09); *G02B 27/017* (2013.01); *G06F 1/163* (2013.01); *G06F 3/011* (2013.01); *G06F 3/014* (2013.01); *G06F 3/038* (2013.01); *G06F 3/0346* (2013.01); *G06F 3/03547* (2013.01); *G06F 3/04842* (2013.01); *G06F 3/04845* (2013.01); *G06T 19/006* (2013.01); *A63F 2300/8082* (2013.01); *G06F 2203/0382* (2013.01)

(58) Field of Classification Search
CPC ..... A63F 13/213; G02B 27/017; G06F 1/163; G06F 3/011
USPC .......................................................... 345/8
See application file for complete search history.

(56) References Cited

U.S. PATENT DOCUMENTS

| | | | |
|---|---|---|---|
| 2010/0277579 A1 | 11/2010 | Cho et al. | |
| 2011/0169734 A1* | 7/2011 | Cho | ...................... G06F 3/0346 345/157 |

(Continued)

FOREIGN PATENT DOCUMENTS

JP    2002-366295 A    12/2002

*Primary Examiner* — Jonathan M Blancha
(74) *Attorney, Agent, or Firm* — Jefferson IP Law, LLP

(57) ABSTRACT

An electronic device is provided. The electronic device a display configured to output a screen, a communication circuit, at least one processor electrically connected with the display and the communication circuit, and a memory electrically connected with the at least one processor, wherein the memory stores instructions that configure the at least one processor to display a first pointer for a first controller based on first data obtained by a first sensor on the screen, and upon determining that a second controller points at the screen based on second data obtained by a second sensor of the second controller, control the display to delete the first pointer from the screen and to display a second pointer for the second controller based on the second data.

20 Claims, 22 Drawing Sheets

(51) Int. Cl.
*G06F 3/0354* (2013.01)
*G06F 1/16* (2006.01)
*G06F 3/0346* (2013.01)

(56) References Cited

U.S. PATENT DOCUMENTS

| | | | |
|---|---|---|---|
| 2013/0201103 A1* | 8/2013 | Park | G06F 3/038 |
| | | | 345/157 |
| 2013/0328762 A1* | 12/2013 | McCulloch | G02B 27/017 |
| | | | 345/156 |
| 2015/0293739 A1* | 10/2015 | Choi | G06F 3/0354 |
| | | | 345/157 |
| 2016/0364910 A1 | 12/2016 | Higgins et al. | |
| 2017/0123489 A1 | 5/2017 | Guenter | |
| 2017/0123516 A1* | 5/2017 | Li | G06F 3/017 |
| 2017/0336882 A1* | 11/2017 | Tome | G06F 3/011 |

\* cited by examiner

METHOD FOR CONTROLLING DISPLAY OF ELECTRONIC DEVICE USING MULTIPLE CONTROLLERS AND DEVICE FOR THE SAME

CROSS-REFERENCE TO RELATED APPLICATION(S)

This application is based on and claims priority under 35 U.S.C. § 119(a) of a Korean patent application number 10-2017-0109676, filed on Aug. 29, 2017, in the Korean Intellectual Property Office, the disclosure of which is incorporated by reference herein in its entirety.

BACKGROUND

1. Field

The disclosure relates to methods for controlling the display of an electronic device using multiple controllers and devices.

2. Description of Related Art

There are being developed devices for providing their users with images using a virtual reality (VR) device. For example, a head-mounted display (HMD) is worn on the user to provide virtual reality images to the user. An HMD may be used together with, e.g., a mobile device. For example, an HMD may be connected with a mobile device, and the user who wears the HMD and moves her head may receive visual information about a VR space that the mobile device produces. The user may select or operate an object in the VR space by manually manipulating a controller (e.g., a hand controller) including a touchpad and home button.

In various applications utilizing various VR spaces, the user may control the display of the electronic device using one or more controllers (e.g., the HMD and the hand controller). For example, in a VR game using a pair of pistols, the user may wear the HMD, hold one hand controller in each hand, and manipulate the HMD and the two hand controllers to kill the enemies on the game screen that the display provides.

An electronic device providing VR space may point at a displayed object using the HMD or hand controller. The user wearing the HMD may point at any one object displayed on the screen that the HMD provides by moving her head or hand holding the hand controller.

The HMD pointing enables a control of the display by the user's simple action, e.g., turning her head, thus eliminating the need for studying how to control. However, doing so for a long time may cause the user to feel tired or have difficulty in pointing at the exact position. The hand controller pointing requires the user to learn how to control, but despite its long-term use, the user would be less likely to suffer from fatigue and be able to achieve relatively precise pointing.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. According, an aspect of the disclosure is to provide an apparatus and method for the electronic device to control the display using a plurality of controllers. For example, the plurality of controllers may include at least one or more of the head-mounted display (HMD) and the hand controller or may include a plurality of controllers of the same kind.

According to an embodiment of the disclosure, the electronic device may reflect the user's intent to assign a right to control the display to at least one of the plurality of controllers and switch and re-assign the control right between the at least one controller corresponding to the user's natural manipulation.

Additional aspects will be set forth in part in the description which follows and, in part, will be apparent from the description, or may be learned by practice of the presented embodiments.

According to an embodiment of the disclosure, the electronic device may assign a right to control the display to a first controller based on whether the first controller points to the screen (e.g., a field of view) that the display provides in a virtual reality (VR) space.

In accordance with an aspect of the disclosure, an electronic device is included. The electronic device includes a display configured to output a screen, a communication circuit, a processor electrically connected with the display and the communication circuit, and a memory electrically connected with the at least one processor, wherein the memory stores instructions that configure the at least one processor to display a first pointer for a first controller based on first data obtained by a first sensor on the screen, and upon determining that a second controller points at the screen based on second data obtained by a second sensor of the second controller, control the display to delete the first pointer from the screen and to display a second pointer for the second controller based on the second data.

In accordance with an aspect of the disclosure, a method for controlling, by an electronic device, a display using a plurality of controllers is provided. The method includes displaying a first pointer for a first controller based on first data obtained by a first sensor on a screen, receiving second data obtained by a second sensor of a second controller, and upon determining that the second controller points at the screen based on the second data, removing the first pointer from the screen and displaying a second pointer for the second controller based on the second data.

In accordance with an aspect of the disclosure, a computer-readable recording medium is provided. The computer-readable recording medium storing instructions configured to perform at least one operation by a processor, the at least one operation comprising displaying a first pointer for a first controller based on first data obtained by a first sensor on a screen, receiving second data obtained by a second sensor of a second controller, and upon determining that the second controller points at the screen based on the second data, removing the first pointer from the screen and displaying a second pointer for the second controller based on the second data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
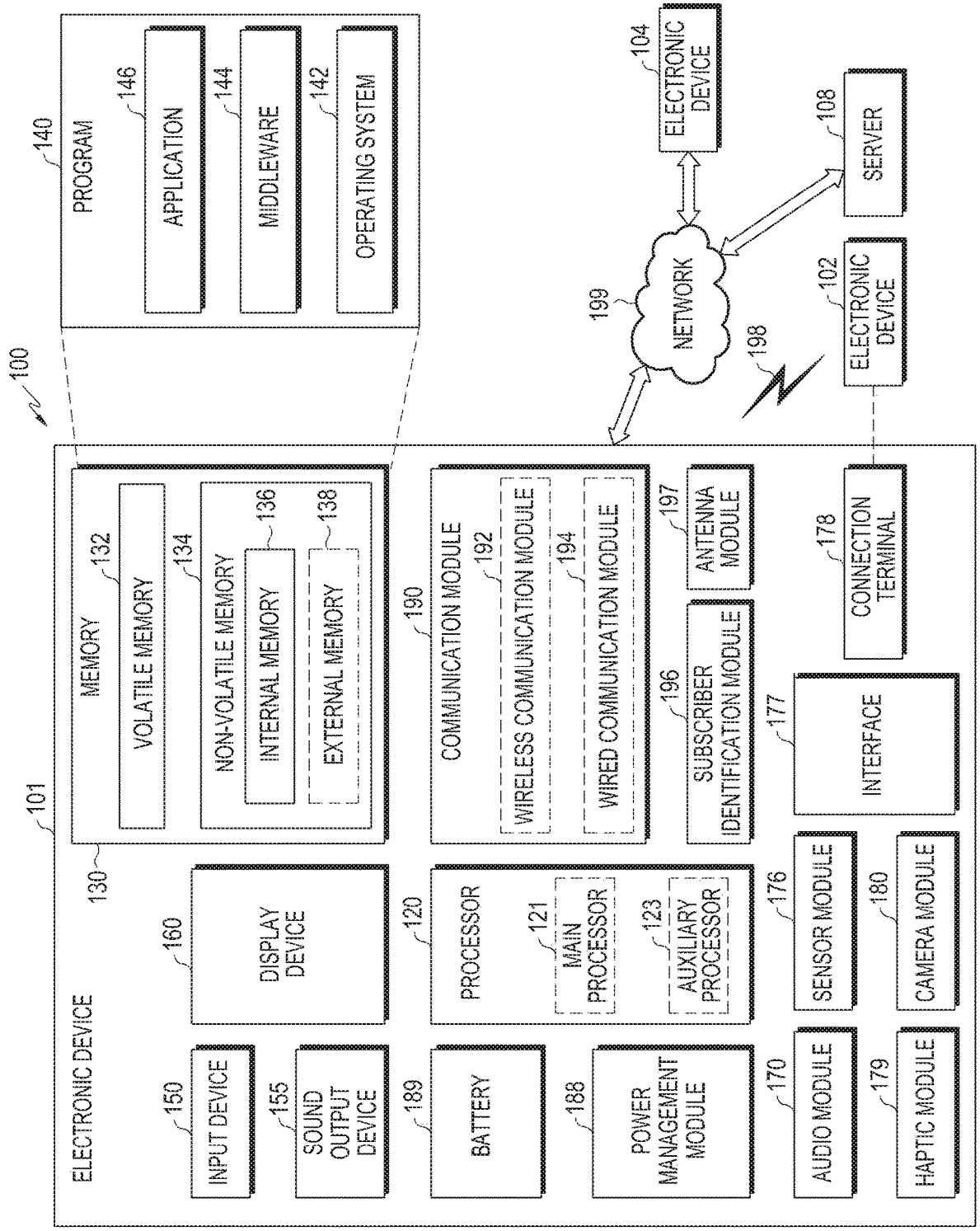
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, a block diagram illustrates an electronic device 101 in a network environment 100 according to various embodiments of the disclosure. The electronic device 101 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, the electronic device 101 may exclude at least one (e.g., the display device 160 or the camera module 180) of the components or add other components. In some embodiments, some components may be implemented to be integrated together, e.g., as if the sensor module 176 (e.g., a fingerprint sensor, an iris sensor, or an illuminance sensor) is embedded in the display device (160) (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. The non-volatile memory 134 may include an internal memory 136 and an external memory 138. According to an embodiment of the disclosure, the processor 120 may include a main processor 121 (e.g., a central processing unit (CPU) or an application processor), and additionally or alternatively, an auxiliary processor 123 (e.g., a graphics processing unit (GPU), an image signal processor, a sensor hub processor, or a communication processor) that is operated independently from the main processor 121 and that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or sensor module 176) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 150 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment of the disclosure, the receiver may be formed integrally or separately from the speaker.

The display device 160 may visually provide information to a user of the electronic device 101. The display device 160 may include, e.g., a display, a hologram device, or a projector and a control circuit for controlling the display, hologram device, or projector. According to an embodiment of the disclosure, the display device 160 may include touch circuitry or a pressure sensor capable of measuring the strength of a pressure for a touch.

The audio module 170 may convert a sound into an electrical signal and vice versa. According to an embodiment of the disclosure, the audio module 170 may obtain a sound through the input device 150 or output a sound through the sound output device 155 or an external electronic device (e.g., an electronic device 102 (e.g., a speaker or a headphone) wiredly or wirelessly connected with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment of the disclosure, the interface 177 may include a high definition multimedia interface (HDMI), a universal serial bus (USB) interface, a secure digital (SD) card interface, or an audio interface.

A connection terminal 178 may include a connector, e.g., a HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment of the disclosure, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through a first network 198 (e.g., a short-range communication network, such as bluetooth, Wi-Fi) direct, or infrared data association (IrDA)) or a second network 199 (e.g., a long-range communication network, such as a cellular network, the Internet, or a communication network (e.g., LAN or wide area network (WAN)). The above-enumerated types of communication modules 190 may be implemented in a single chip or individually in separate chips.

According to an embodiment of the disclosure, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment of the disclosure, the communication module 190 (e.g., the wireless communication module 192) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., commands, instructions, or data) therebetween.

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations executed on the electronic device 101 may be run on one or more other external electronic devices. According to an embodiment of the disclosure, when the electronic device 101 should perform a certain function or service automatically or at a request, the electronic device 101, instead of, or in addition to, executing the function or service on its own, may request an external electronic device to perform at least some functions associated therewith. The external electronic device (e.g., electronic devices 102 and 104 or server 108) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

According to an embodiment of the disclosure, an electronic device 101 (or the processor 120) may display a first pointer for a first controller based on first data obtained by a first sensor on a screen provided by the display device 160, and upon determining that a second controller indicates the screen based on second data obtained by a second sensor of the second controller and received from the second controller using the communication module 190, control the display to delete the first pointer from the screen and to display a second pointer for the second controller based on the second data.

According to an embodiment of the disclosure, the electronic device 101 may receive third data input to the second controller from the second controller and control a first object indicated by the second pointer among a plurality of objects included in the screen based on the second data and the third data.

According to an embodiment of the disclosure, when the first sensor is included in the first controller, and the first controller is an external device, the electronic device 101 may receive the first data from the first controller using the communication module 190.

According to an embodiment of the disclosure, the electronic device 101 may receive fourth data input to the first controller from the first controller using the communication module 190, and when the second controller indicates an outside of the screen, control a second object indicated by the first pointer among a plurality of objects included in the screen based on the first data and the fourth data.

According to an embodiment of the disclosure, the electronic device 101 may receive an input value for a button of the second controller from the second controller using the communication module 190 and control the second object based on the input value, the first data, and the fourth data.

According to an embodiment of the disclosure, the electronic device 101 may control the display device 160 to display a message to induce the second controller to move on the screen.

According to an embodiment of the disclosure, the electronic device 101 may receive fifth data obtained by a sensor of a third controller from the third controller using the communication module 190.

Upon determining that the third controller indicates the screen based on the fifth data, the electronic device 101 may control the display device 160 to display a third pointer on the screen.

According to an embodiment of the disclosure, the electronic device 101 may display information for identifying the second controller or the third controller on the screen, recognize the second controller upon receiving data from the second controller using the communication module 190, and recognize the third controller upon receiving data from the third controller using the communication module 190.

According to an embodiment of the disclosure, the first controller or the second controller may be configured to be worn on a user's head or held in the user's hand.

According to an embodiment of the disclosure, the electronic device 101 may generate a virtual reality (VR) space. The screen may be a portion of the VR space which is selected based on the first data.

According to an embodiment of the disclosure, the electronic device 101 may control the display device 160 to display a lead line from a position of the second controller to the second pointer in the VR space.

According to an embodiment of the disclosure, when a position of the second controller in the VR space is included in a predetermined range, the electronic device 101 may receive voice data obtained by the first sensor from the second controller using the communication module 190 and control the display device 160 based on the received voice data.

According to an embodiment of the disclosure, when a distance between the first pointer and the second pointer is a threshold or less, the electronic device 101 may associate the data obtained by the first sensor with the data obtained by the second sensor and control the display device 160.

According to an embodiment of the disclosure, the electronic device 101 may control the display device 160 to zoom in and display an object on the screen when the distance between the first pointer and the second pointer increases based on the data obtained by the first sensor and the data obtained by the second sensor and to zoom out and display the object on the screen when the distance between the first pointer and the second pointer decreases.

According to an embodiment of the disclosure, the electronic device 101 may identify a third object corresponding to the first pointer and the second pointer among a plurality of objects displayed on the screen and control the third object based on data input to the first controller or the second controller.

Figure 2:
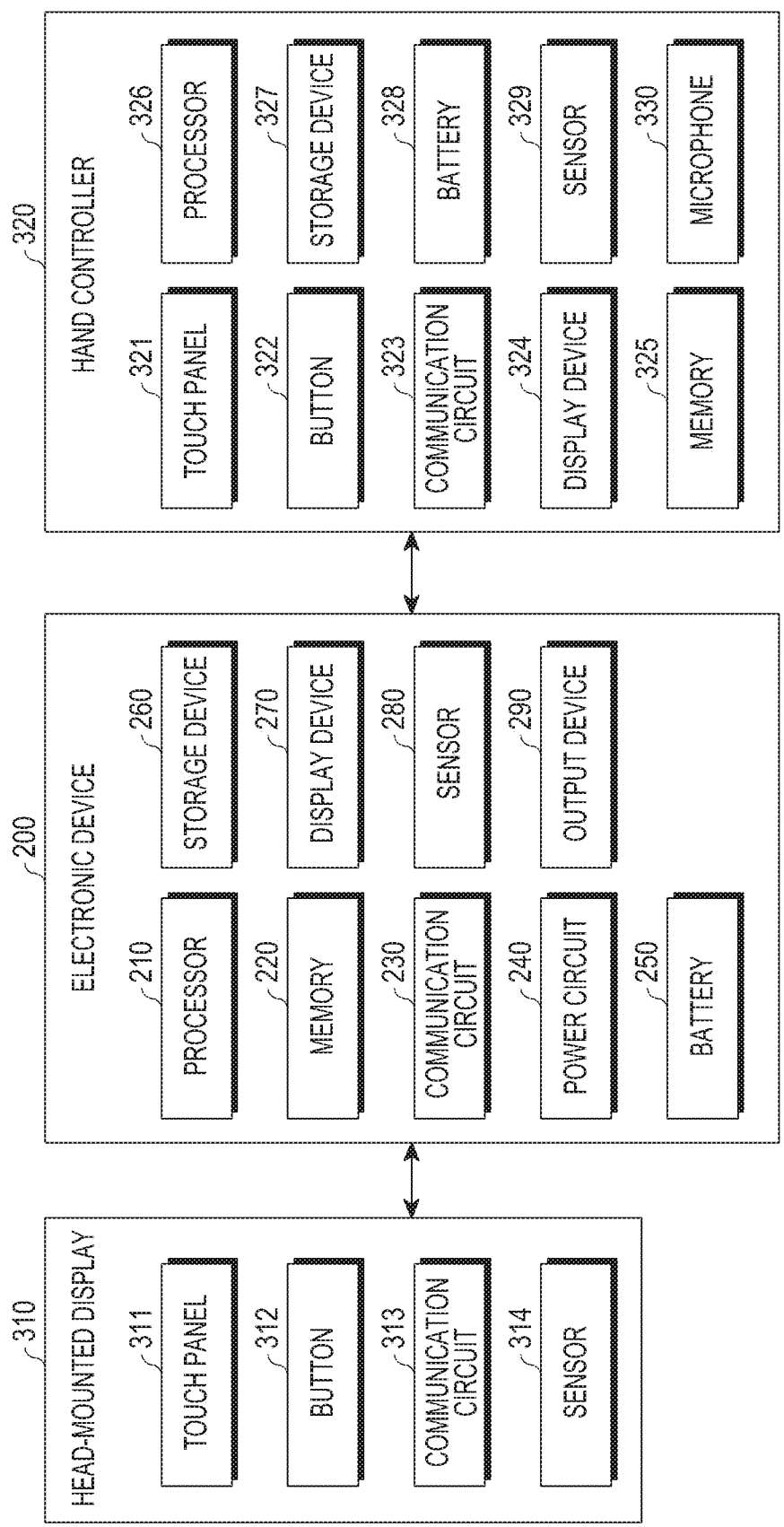
FIG. 2 illustrates block diagrams of an electronic device and a plurality of controllers according to an embodiment of the disclosure.

FIG. 2 illustrates block diagrams of an electronic device and a plurality of controllers according to an embodiment of the disclosure.

Referring to FIG. 2, an electronic device 200 (e.g., the electronic device 101 of FIG. 1) may transmit or receive data and interoperate with a plurality of controllers (e.g., a head-mounted display (HMD) 310) or a hand controller 320).

The electronic device 200 may include a processor 210 (e.g., the processor 120 of FIG. 1), a memory 220 (e.g., the memory 130 of FIG. 1), a communication circuit 230 (e.g., the communication module 190 of FIG. 1), a power circuit 240 (e.g., the power management module 188 of FIG. 1), a battery 250 (e.g., the battery 189 of FIG. 1), a storage device 260 (e.g., the external memory 138 of FIG. 1), a display device 270 (e.g., the display device 160 of FIG. 1), a sensor 280 (e.g., the sensor module 176 of FIG. 1), and an output device 290 (e.g., the sound output device 155 of FIG. 1).

The processor 210 may include a graphic processor and an application processor. The graphic processor may visualize a VR space on the display device 270 (e.g., a display). The application processor may execute various functions by one or more instructions stored in the memory 220.

The memory 220 may store various instructions that the processor 210 may execute. The electronic device 200 may further include the storage device 260, e.g., a micro SD card, separately from the memory 220.

The communication circuit 230 may include a wireless communication circuit (e.g., the wireless communication module 192 of FIG. 1) and a wired communication module (e.g., the wired communication module 194 of FIG. 1). The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). According to an embodiment of the disclosure, the wireless communication may include at least one of, e.g., Wi-Fi, light fidelity (Li-Fi), bluetooth, bluetooth low power (BLE), zigbee, near field communication (NFC), magnetic secure transmission (MST), radio frequency, or body area network (BAN). According to an embodiment of the disclosure, the wireless communication may include GNSS. The GNSS may be, e.g., global positioning system (GPS), global navigation satellite system (Glonass), Beidou navigation satellite system (Beidou) or Galileo, or the European global satellite-based navigation system. Hereinafter, the terms "GPS" and the "GNSS" may be used interchangeably herein. The wired connection may include at least one of, e.g., USB, earjack, HDMI, recommended standard 232 (RS-232), PLC, or plain old telephone service (POTS).

The power circuit 240, as a module to manage the power supplied to the electronic device 200, may be configured as at least a part of, e.g., a PMIC. According to an embodiment of the disclosure, the power circuit may include a battery charging circuit that may be used to charge the battery 250 so that the battery 250 may be reused.

The display device 270 may visually provide information to a user of the electronic device 200. The display device 270 may include, e.g., a display, a hologram device, or a projector and a control circuit for controlling the display, hologram device, or projector. According to an embodiment of the disclosure, the display device 160 may include touch circuitry or a pressure sensor capable of measuring the strength of a pressure for a touch.

The sensor 280 may include an inertia measurement unit (IMU). According to an embodiment of the disclosure, the IMU may include an accelerometer, a gyroscope, a magnetometer, and an altimeter.

The output device 290 may include, e.g., an audio module to audibly provide information to the user of the electronic device 200.

The HMD 310 may include a touch panel 311 (e.g., the input device 150 of FIG. 1), a button 312 (e.g., the input device 150 of FIG. 1), a communication circuit 313 (e.g., the communication module 190 of FIG. 1), and a sensor 314 (e.g., the sensor module 176 of FIG. 1).

The touch panel 311, as an input module to be able to receive data from the user of the HMD 310, may adopt at least one scheme of, e.g., a capacitive, resistive, IR, or ultrasonic scheme. The touch panel 311 may further include a control circuit. The touch panel 311 may further include a tactile layer and may provide a user with a tactile reaction.

The button 312, as an input module to be able to receive data from the user of the HMD 310, may include, e.g., a physical key button, an optical key button, a trigger, or a keypad. The HMD 310 may include a plurality of buttons, e.g., any one or more of a home button, a cancel button, up/down buttons, and left/right buttons. According to an embodiment of the disclosure, the HMD 310 may set the respective corresponding functions of the plurality of buttons 312.

The communication circuit 313, as a module to transmit or receive data with another electronic device, may include a wireless communication circuit and a wired communication circuit. According to an embodiment of the disclosure, the communication circuit 230 of the electronic device 200 may apply.

The sensor 314 may measure the motion of the HMD 310 by the user and may include, e.g., an IMU. According to an embodiment of the disclosure, the IMU may include a proximity sensor, an accelerometer, a gyroscope, a magnetometer, and an altimeter. According to an embodiment of the disclosure, the proximity sensor may be used to detect the user's wearing the HMD 310. According to an embodiment of the disclosure, the HMD 310 may transmit various types of data obtained by the sensor 314 to the electronic device 200 using the communication circuit 313.

The hand controller 320 may include a touch panel 321 (e.g., the input device 150 of FIG. 1), a button 322 (e.g., the input device 150 of FIG. 1), a communication circuit 323 (e.g., the communication module 190 of FIG. 1), a display device 324 (e.g., the display device 160 of FIG. 1), a memory 325 (e.g., the memory 130 of FIG. 1), a processor 326 (e.g., the processor 120 of FIG. 1), a storage device 327 (e.g., the memory 130 of FIG. 1), a battery 328 (e.g., the battery 189 of FIG. 1), a sensor 329 (e.g., the sensor module 176 of FIG. 1), and a microphone 330 (e.g., the input device 150 of FIG. 1).

For the touch panel 321, as a module to receive data from the user of the hand controller 320, according to an embodiment of the disclosure, the touch panel 311 of the HMD 310 or the display device 270 of the electronic device 200 may apply.

The button 322 may be a module to receive data from the user of the hand controller 320. According to an embodiment of the disclosure, the hand controller 320 may include a plurality of buttons 322. For the button 322, e.g., the button 312 of the HMD 310 may apply.

The communication circuit 323, as a module to perform data communication with the electronic device 200, may include a wireless communication circuit and a wireless communication circuit. For example, the communication circuit 230 of the electronic device 200 may apply. According to an embodiment of the disclosure, the hand controller 320 may transmit data obtained by the sensor 329 to the electronic device 200 using the communication circuit 323.

The display device 324, as a module to provide information to the user of the hand controller 320, may include, e.g., a light emitting diode (LED).

The memory 325 may include various instructions that are executed to operate the processor 326 and may store a predetermined function corresponding to the button 322. According to an embodiment of the disclosure, the hand controller 320 may further include the storage device 327 separately from the memory 325.

Where the hand controller 320 is wirelessly operated, the battery 328 may be a module to supply power and may include, e.g., a secondary battery that is rechargeable.

The sensor 329 may be a module capable of detecting the motion of the hand controller 320. For example, the sensor 314 of the HMD 310 or the sensor 280 of the electronic device 200 may apply.

The microphone 330 may be a module to receive various sounds. The user may input voice commands through the microphone 330. According to an embodiment of the disclosure, voice data received by the microphone 330 may be transmitted to the electronic device 200 using the communication circuit 323.

Figure 3A:
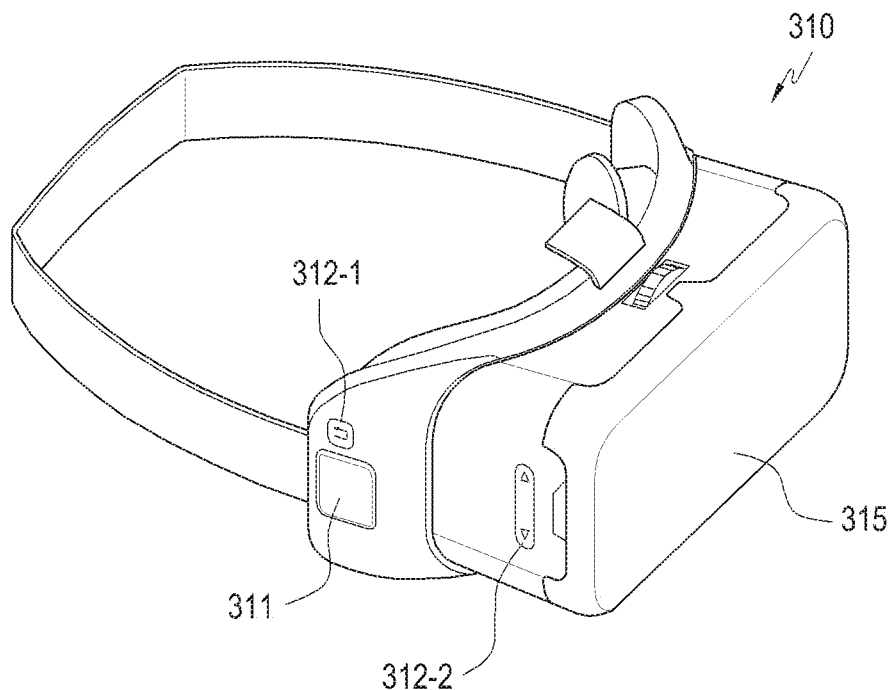
FIGS. 3A and 3B are views illustrating examples of controllers according to an embodiment of the disclosure.
Figure 3B:
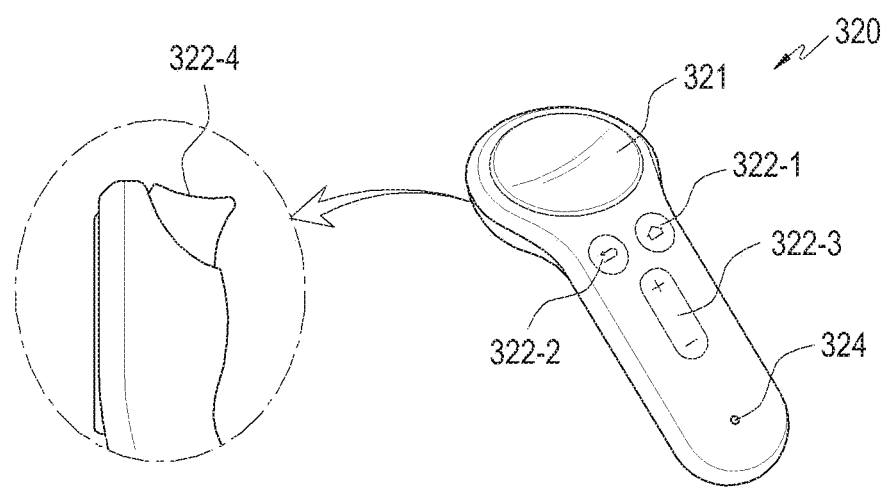

FIGS. 3A and 3B are views illustrating examples of controllers according to an embodiment of the disclosure.

Referring to FIG. 3A, an HMD 310 (e.g., the HMD 310 of FIG. 2) is illustrated and may be configured for the user may put on her head. Referring to FIG. 3B, a hand controller 320 (e.g., the hand controller 320 of FIG. 2) is illustrated that the user may use in her hand. The HMD 310 may be implemented in various head-mountable shapes, e.g., like that shown in FIG. 3A. The HMD 310 of FIG. 3A may include a front cover 315 to visually provide the user with a VR space, a cancel key (back key) 312_1, a volume key 312_2 to adjust sound volume, and a touch panel 311 for the user's input. The user may wear the HMD 310 on her head and manipulate the HMD 310 by moving her head. The VR space is a three-dimensional (3D) space. The user may see the whole space in the 360-degree directions in any position inside the VR space. According to an embodiment of the disclosure, the display of the electronic device 200 may provide, to the screen (e.g., a field of view), a portion of the VR space selected depending on the direction in which the HMD 310 points.

Referring to FIG. 3B, the hand controller 320 that may be implemented to be manipulated by the user in her hand, such as a remote controller. According to an embodiment of the disclosure, the hand controller 320 may include a plurality of buttons 322, which, e.g., include a home button 322_1 for displaying a fixed display screen, a cancel button 322_2 for displaying the prior screen of the screen currently displayed, a volume button 322_3 for adjusting sound volume, a trigger button 322_4 for selecting the display object pointed at, and a touch panel 321 for the user's input as shown in FIG. 3B. The user may change screens on the display by the home button 322_1 and the cancel button 322_2 adjust the volume of the sound played by the volume button 322_3, and move an object (e.g., an arrow icon) displayed within the field of view of the VR space by manipulating the touch panel 321. According to an embodiment of the disclosure, when the user manipulates the hand controller 320 by moving the hand controller 320 in her hand, the position pointed at in the VR space may be moved corresponding to the movement of the hand controller 320.

According to an embodiment of the disclosure, the HMD 310 of FIG. 3A and the hand controller 320 of FIG. 3B may be used to perform various manipulations, such as displaying the display screen of the electronic device 200, i.e., the field of view for the VR space, moving the field of view, selecting an object within the field of view, or deleting the object.

Figure 4A:
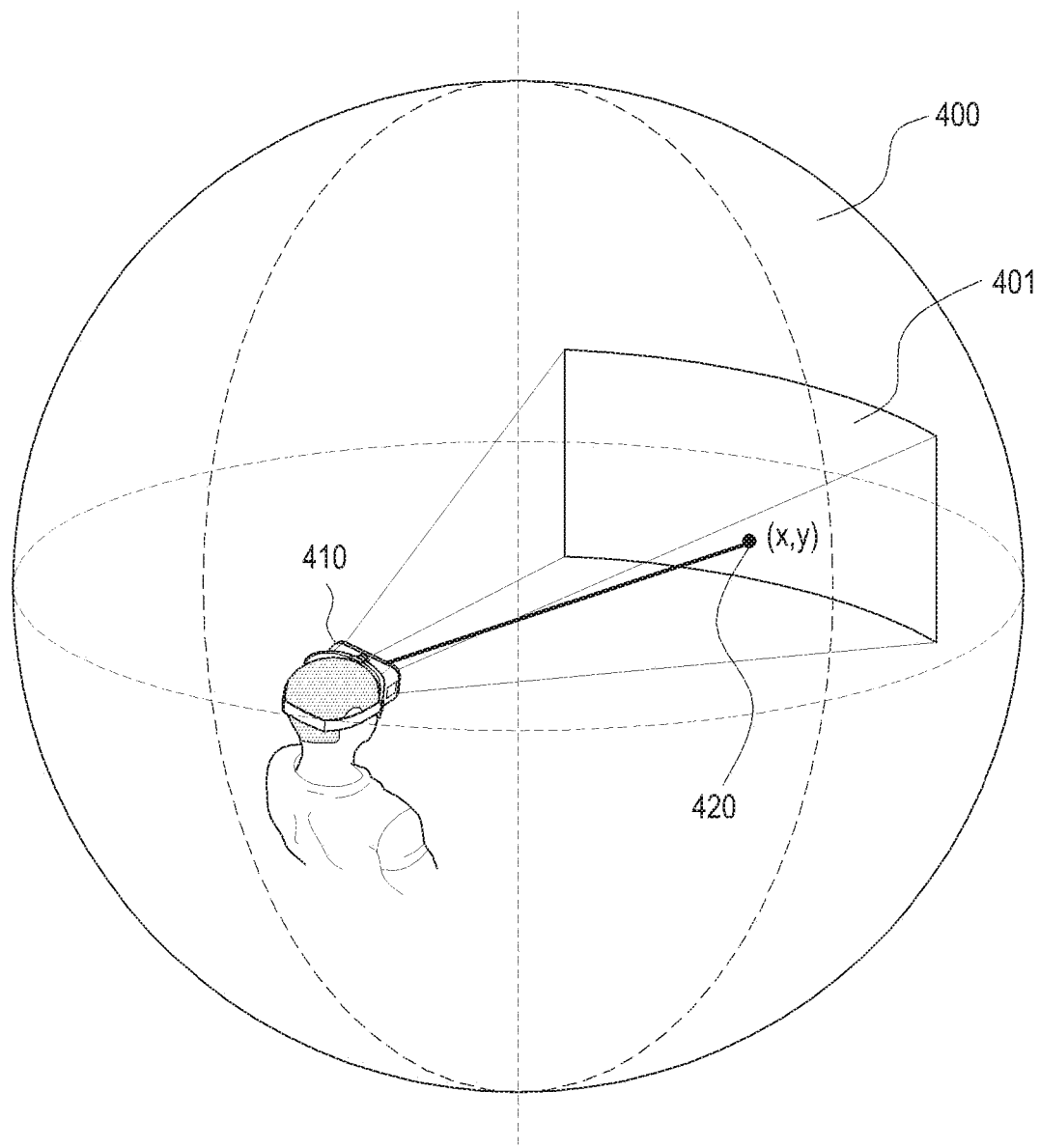
FIG. 4A is a view illustrating an example in which a head mounted display (HMD) points at a particular position in a field of view according to an embodiment of the disclosure.

FIG. 4A is a view illustrating an example in which an HMD points at a particular position in a field of view according to an embodiment of the disclosure.

Referring to FIG. 4A, a user wearing an HMD 410 may point at any position in VR space 400. According to an embodiment of the disclosure, the HMD 410 may point at a particular position in the VR space 400 based on the position and angle (direction) of the HMD 410. The position that the HMD 410 points at may be a particular position 420 in the VR space. Referring to FIG. 4A, where the field of view 401 of the VR space 400 displayed to the user is a plane constituted of coordinates (0, 0), (0, y_FOV), (x_FOV, 0), and (x_FOV, y_FOV), the position at which the HMD 410 points may be p_head_controller (x, y). For example, the electronic device 200 may allow the HMD to point at a particular object among a plurality of objects displayed in the field of view by manipulating the position pointed at.

According to an embodiment of the disclosure, p_head_controller may correspond to the center point of the field of view. According to an embodiment of the disclosure, since the VR space is a 3D space, it is obvious that the field of view 401 may be provided to the user in a 3D shape.

According to an embodiment of the disclosure, the electronic device 200 may control the display to display a pointer icon at the coordinates in the field of view corresponding to the position 420 that the HMD 410 points at.

According to an embodiment of the disclosure, where the user wearing the HMD 410 moves her head left/right or up/down, the electronic device 200 may change the field of view depending on the position pointed at. For example, the position that the HMD 410 points at may be the center of the field of view. As another example, the electronic device 200 may move the position of the pointer displayed in the field of view using the touch pad included in the HMD 410. For example, the position that the HMD 410 points at may not be the center of the field of view.

Figure 4B:
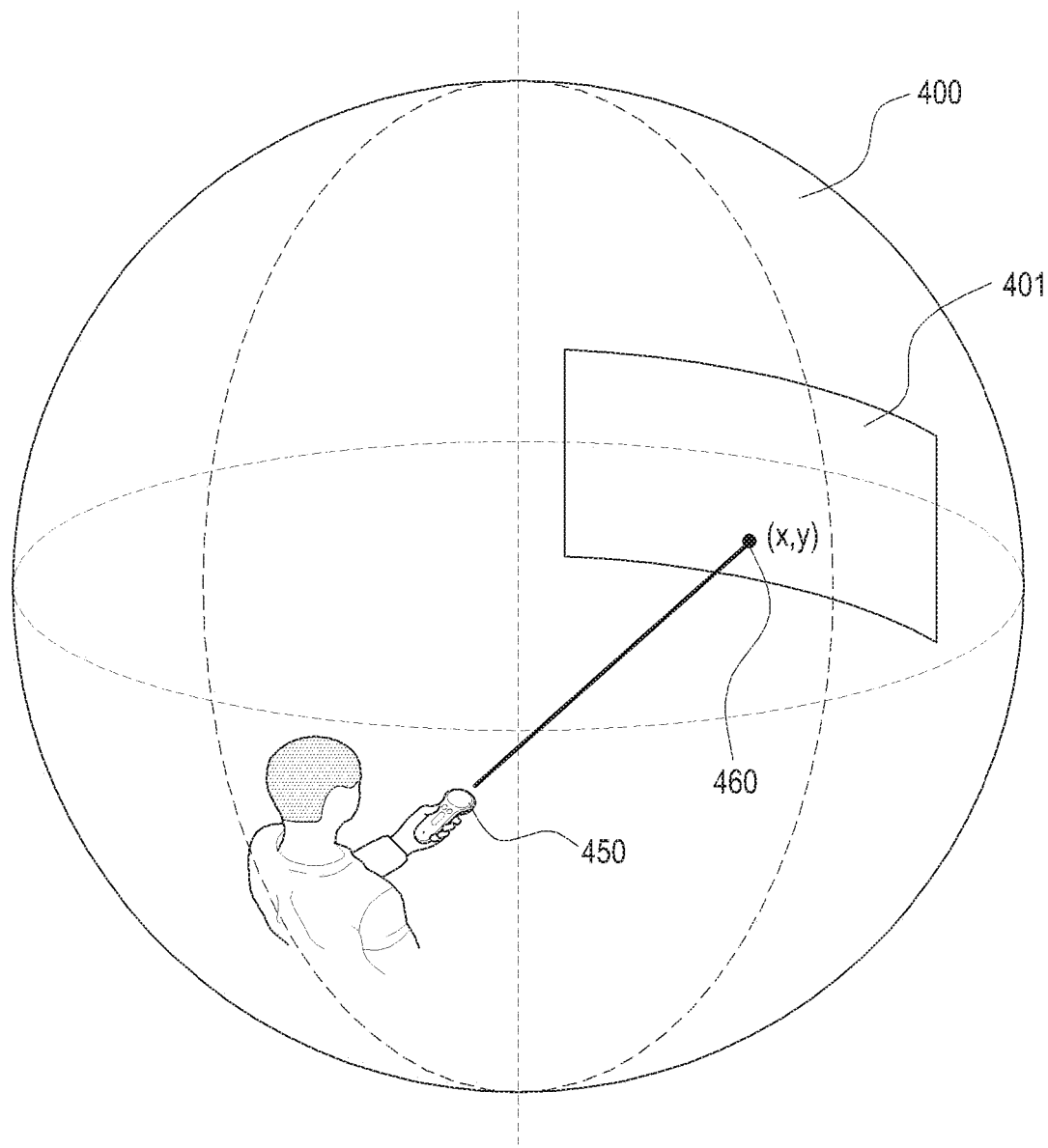
FIG. 4B is a view illustrating an example in which a hand controller points at a particular position in a field of view according to an embodiment of the disclosure.

FIG. 4B is a view illustrating an example in which a hand controller points at a particular position in a field of view according to an embodiment of the disclosure.

Referring to FIG. 4B, when the user manipulates a hand controller 450 in her hand, the hand controller 200 may point at any position in the VR space depending on the direction that the hand controller 450 indicates. According to an embodiment of the disclosure, as shown in FIG. 4B, the electronic device 200 may point at a particular position in the VR space based on the position and angle (direction) of the hand controller 450. For example, the particular position may be the position at which the hand controller 450 points. The field of view 401 of the VR space 400 displayed on the electronic device 200 is a plane constituted of the coordinates (0, 0), (0, y_FOV), (x_FOV, 0), and (x_FOV, y_FOV), the position 460 at which the hand controller 450 points may be p_hand_controller (x, y). For example, the electronic device 200 may point at a particular object among a plurality of objects displayed in the field of view 401 depending on the direction that the hand controller 450 indicates. The field of view 401 of FIG. 4B may be the same as the field of view 401 of FIG. 4A. According to an embodiment of the disclosure, the field of view may be determined as at least a portion of the VR space 400 with respect to the position and angle of the HMD (not shown).

According to an embodiment of the disclosure, the electronic device 200 may control the display to display a pointer icon at the coordinates in the field of view corresponding to the position 460 that the hand controller 450 points at.

According to an embodiment of the disclosure, where the position of the hand controller 450 or the direction that the hand controller 450 indicates is changed, the electronic device 200 may move the position 460 pointed at, based on the position and direction of the hand controller 450. The electronic device 200 may move the position pointed at displayed in the field of view 401 by manipulating the touch pad provided in the hand controller 450. According to an embodiment of the disclosure, the electronic device 200 may display a pointer icon in the position pointed at in the field of view 401.

According to an embodiment of the disclosure, the electronic device 200 may display a lead line from the position of the hand controller 450 to the position 460 pointed at by the hand controller 450 in the VR space as shown in FIG. 4B.

According to an embodiment of the disclosure, the electronic device 200 may control the display using a plurality of controllers. The plurality of controllers may be configured with at least one or more of an HMD and a hand controller. Described above in connection with FIGS. 4A and 4B are examples in which the electronic device 200 performs manipulation using each of the HMD and the HMD depending on the type of the controller. Now described with reference to FIG. 5 is an embodiment in which the electronic device 200 uses a plurality of controllers together.

Figure 5:
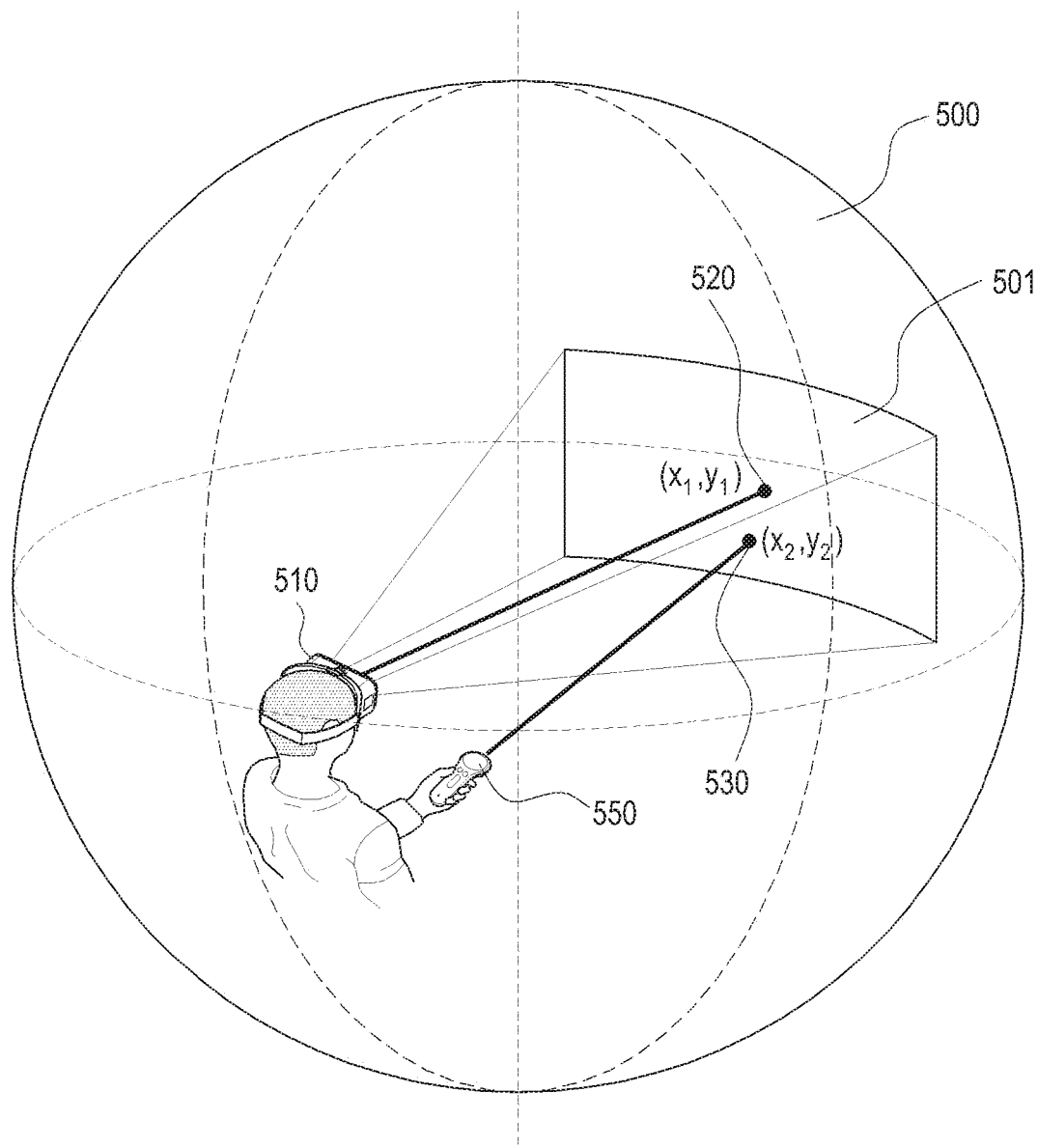
FIG. 5 is a view illustrating an example in which a plurality of controllers point at particular positions according to an embodiment of the disclosure.

FIG. 5 is a view illustrating an example in which a plurality of controllers point at a plurality of positions according to an embodiment of the disclosure.

Referring to FIG. 5, when a plurality of objects may be included in the VR space 500, and an area in the VR space 500 viewed by the user is a field of view 501, the electronic device 200 may control the plurality of objects in the field of view 501 using a plurality of controllers. The plurality of controllers may include an HMD 510 and a hand controller 550 as shown in FIG. 5. When the user wears the HMD 510 on her head, holds the hand controller 550 in her hand, and manipulates the HMD 510 and/or the hand controller 550, the electronic device 200 may point at any position in the VR space as the HMD 510 and/or the hand controller 550 is manipulated. According to an embodiment of the disclosure, the electronic device 200 may select an object in the VR space 500 using the HMD 510 and/or the hand controller 550. For example, the electronic device 200 may select a media object and play the selected media object. According to an embodiment of the disclosure, the electronic device 200 may perform various manipulations depending on the characteristics of the object pointed at. For example, where the object pointed at is an execution object, the electronic device 200 may execute, delete, move, or perform other various types of control on, the object. The VR space 500 may be generated in 3D, and it is apparent that various settings may be made thereto. Referring to FIG. 5, the electronic device 200 may display a field of view 501, which may be viewed by the user, in the spherical VR space 500 as a two-dimensional (2D) plane. According to an embodiment of the disclosure, the electronic device 200 may display various objects in the field of view 501. For example, the electronic device 200 may display an execution screen of a game application including a plurality of character objects and a menu icon, a photo gallery including a plurality of image objects, an execution window of an internet application including text, images, uniform resource locator (ULR), or other various objects, or a movie playing screen.

According to an embodiment of the disclosure, the electronic device 200 may point at any position in the VR space 500 based on the position of the HMD 510 in the VR space and the direction (angle) of the HMD 510.

According to an embodiment of the disclosure, the electronic device 200 may point to the VR space 500 based on the position of the hand controller 550 in the VR space 500 and the direction (angle) of the hand controller. Where the field of view includes both the position 520 pointed at by the HMD 510 and the position 530 pointed at by the hand controller 550, the electronic device 200 may display the two positions in the field of view 501. According to an embodiment of the disclosure, the electronic device 200 may display a lead line for the controller.

According to an embodiment of the disclosure, the electronic device 200 may point at any position in the VR space 500 using the HMD 510 or the hand controller 550. Referring to FIG. 5, the electronic device 200 may point at a first position $(x_1, y_1)$ in the field of view 501 depending on the direction that the HMD 510 indicates and a second position $(x_2, y_2)$ in the field of view 501 depending on the direction that the hand controller 550 indicates. For example, where an object and another object are displayed in the first position and the second position, respectively, the electronic device 200 may point at the two objects using both the controllers. According to an embodiment of the disclosure, the electronic device 200 may compare the number of objects displayed in the field of view with the number of the controllers, and when the number of the objects in the field of view is larger than the number of the controllers, the electronic device 200 may point at as many objects as the number of the controllers. Otherwise, where the number of the objects in the field of view is smaller than the number of the controllers, the electronic device 200 may determine which controllers are to point at the displayed objects. According to an embodiment of the disclosure, the electronic device 200 may assign a display control right to a first controller to allow the first controller to perform various types of control, such as pointing at, selecting, deleting, or executing an object in the VR space, and the first controller may be said to have the display control right. Described in connection with FIG. 5 is an example in which the electronic device 200 allows two controllers to point to positions (e.g., objects) when the number of the objects (not shown) is larger than the number of the controllers.

Figure 6A:
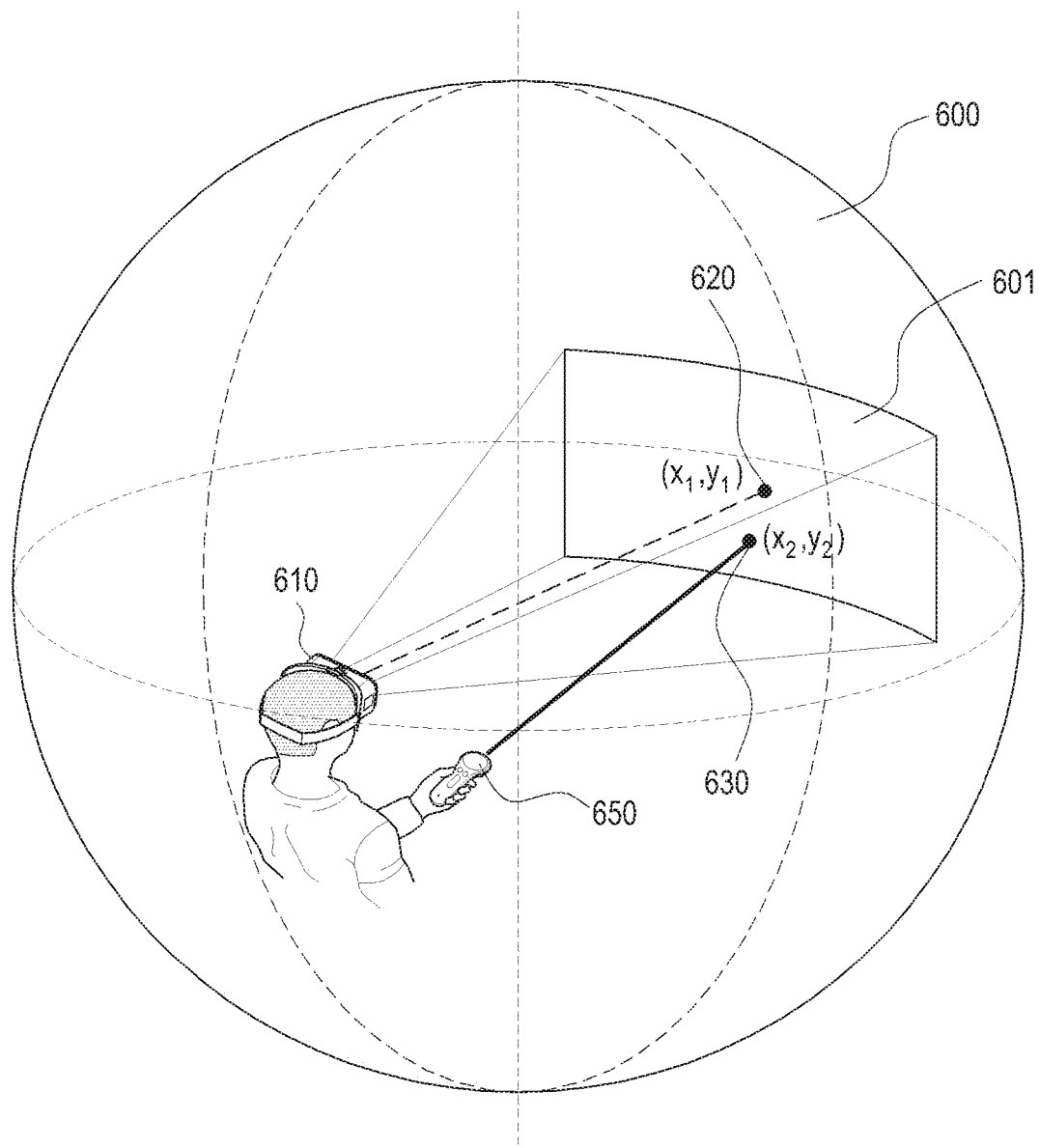
FIGS. 6A and 6B are views illustrating an example in which an electronic device points at a field of view depending on a position where a hand controller among a plurality of controllers points according to an embodiment of the disclosure.
Figure 6B:
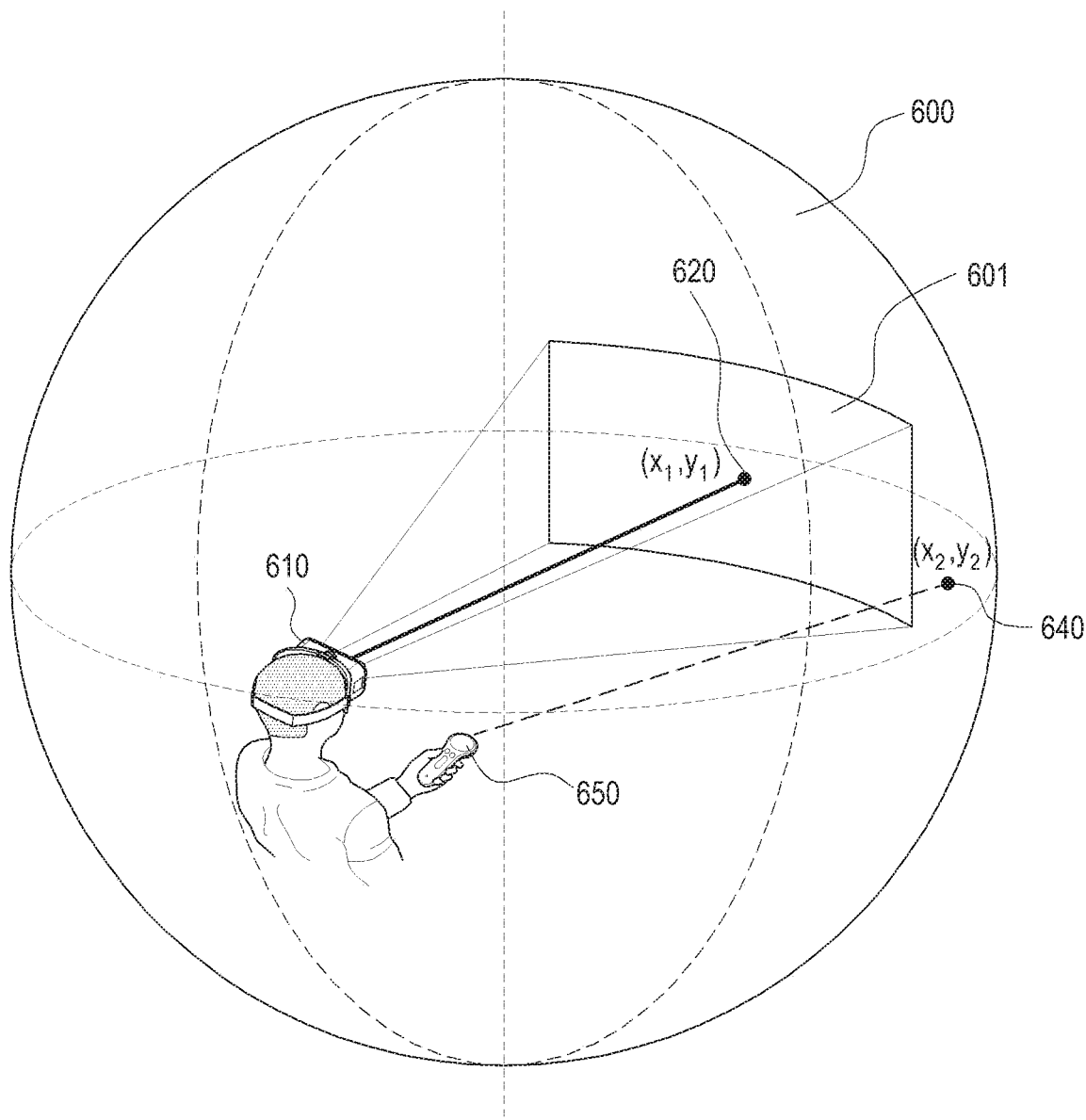

FIGS. 6A and 6B are views illustrating an example in which an electronic device points any one of a plurality of controllers at a field of view depending on a position where a hand controller among the plurality of controllers points according to an embodiment of the disclosure.

Referring to FIG. 6A, when the user uses both an HMD 610 and a hand controller 650, the electronic device 200 may identify the position 630 or 640 pointed at by the hand controller 650 and determine whether the position 630 or 640 pointed at by the hand controller 650 is included in a field of view 601 in VR space 600. In other words, the electronic device 200 may determine whether the hand controller 650 points within the field of view 601.

Where the position 630 pointed at by the hand controller 650 is determined to be included in the field of view 601 as shown in FIG. 6A, the electronic device 200 may perform control to allow the hand controller 650 to have a display control right by which the hand controller 650 may control the operation of the display, e.g., point at the field of view 601. Referring to FIG. 6B, when the position 640 pointed at by the hand controller 650 is not included in the field of view 601, the electronic device 200 may perform control to allow the HMD 610 to have the display control right by which the HMD 610 may control the operation of the display. According to an embodiment of the disclosure, the electronic device 200 may indicate the controller with the display control right in a solid line and the other controller without no display control right in dashed lines.

Referring back to FIG. 6A, the electronic device 200 may perform various types of control, such as pointing at, selecting, deleting, or executing, on an object in the field of view 601 corresponding to the position 630 pointed at by the hand controller 650 as the hand controller 650 moves. According to an embodiment of the disclosure, where the hand controller 650 has the display control right, the electronic device 200 cannot control the objects in the field of view 601 corresponding to the movement of the HMD 610 even when the user wears the HMD 610.

Referring to FIG. 6B, the electronic device 200 may perform various types of control, such as pointing at, selecting, deleting, or executing, on an object in the field of view 601 corresponding to the position 620 pointed at by the HMD 610 as the HMD 610 moves. According to an embodiment of the disclosure, where the HMD 610 has the display control right, the electronic device 200 cannot control the objects in the field of view by manipulating the hand controller 650 even when the user holds the hand controller 650 in her hand.

Figure 7:
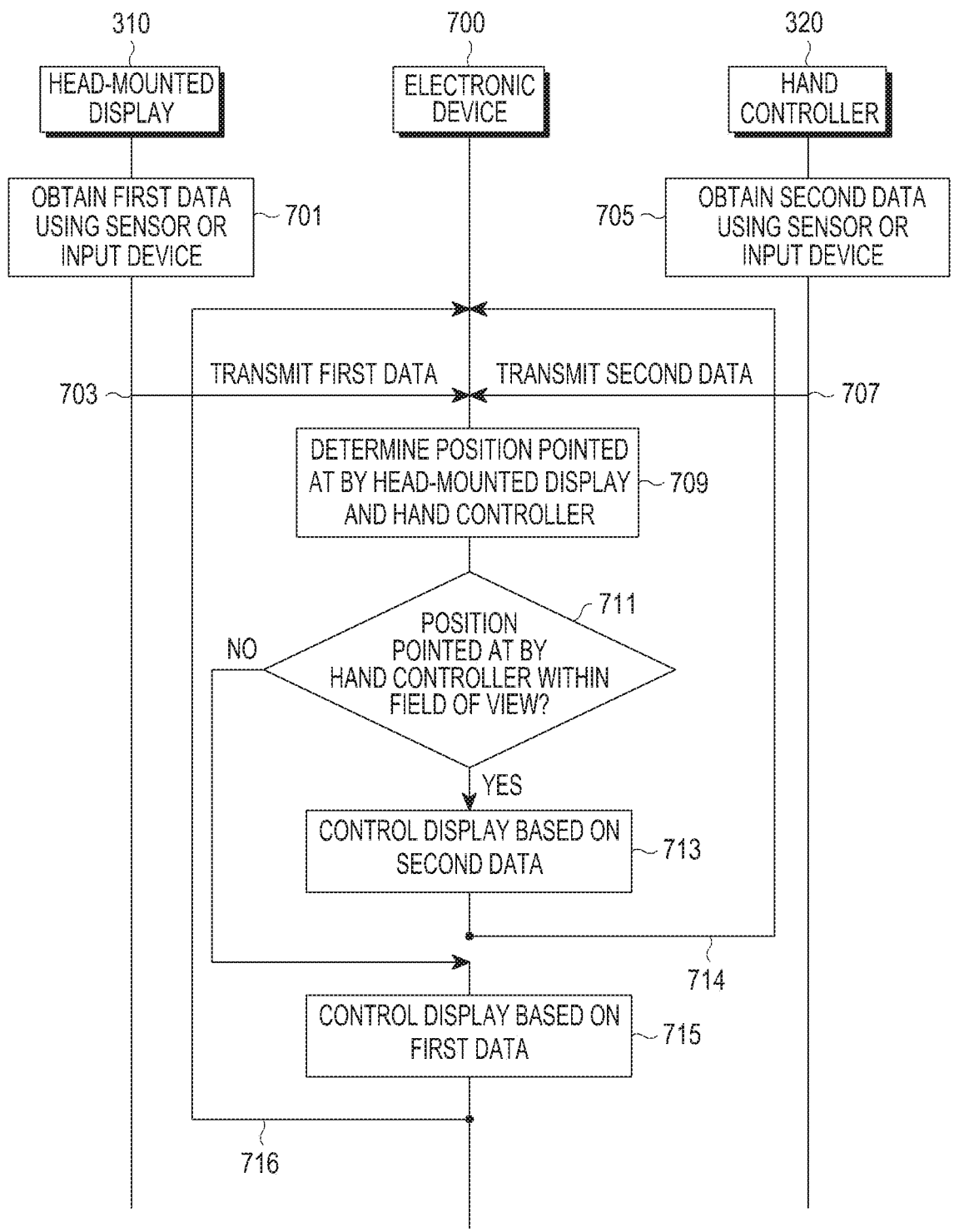
FIG. 7 is a sequence diagram illustrating operation of an electronic device controlling a display according to an embodiment of the disclosure.

FIG. 7 is a sequence diagram illustrating operation of an electronic device controlling a display according to an embodiment of the disclosure.

Referring to FIG. 7, an electronic device 700 may perform data communication with a plurality of controllers (the HMD 310 or the hand controller 320) to determine whether the user wears (uses) the HMD 310 and the hand controller 320 and the positions or directions in which the HMD 310 and the hand controller 320 indicate. According to an embodiment of the disclosure, the electronic device 700 may receive, from the plurality of controllers, data obtained by the respective sensors of the plurality of controllers and data input to the input devices (e.g., microphones) of the plurality of controllers. For example, the electronic device 700 may receive, from the HMD, data obtained by a proximity sensor of the HMD and determine whether the user wears the HMD. As another example, the electronic device 700 may obtain physical data (position or direction) about the HMD 310 using a sensor of the electronic device 700 physically connected to the HMD 310. According to an embodiment of the disclosure, the electronic device 700 may identify information about the HMD 310 using data sensed by the electronic device 700 but without receiving sensed data from the HMD 310.

In operation 701, the HMD 310 may obtain first data using a sensor 314 or input device (e.g., the touch panel 311 or button 312) included in the HMD 310. For example, the HMD 310 may obtain the acceleration of the motion of the HMD 310 which is measured by an accelerometer and a value measured by a gyrosensor. The HMD 310 may obtain an input value obtained by pressing the home button.

In operation 703, the HMD 310 may transmit the first data to the electronic device 700. According to an embodiment of the disclosure, the HMD 310 may transmit the first data to the electronic device 700 corresponding to an event that occurs in a predetermined period or as the sensor obtains data, using wired communication, such as USB.

In operation 705, the hand controller 320 may obtain second data using a sensor 329 or input device (e.g., the touch panel 321, button 322, or microphone 330) included in the hand controller 320. For example, the hand controller 320 may obtain the acceleration of the motion of the hand controller 320 which is measured by an accelerometer and a value measured by a gyro sensor. The hand controller 320 may receive a touch manipulation value of the touch panel 321 included in the hand controller 320.

In operation 707, the hand controller 320 may transmit the second data to the electronic device 700. According to an embodiment of the disclosure, the hand controller 320 may transmit the second data to the electronic device 700 corresponding to an event that occurs in a predetermined period or as the sensor obtains data, using wireless communication, such as BLE.

In operation 709, the electronic device 700 may determine the positions pointed at by the HMD 310 and the hand controller 320, based on the first data and the second data.

In operation 711, the electronic device 700 may determine whether the position pointed at by the hand controller 320 is included in the field of view. For example, the electronic device 700 may determine whether the hand controller 320 indicates the screen (field of view) provided to the user.

In operation 713, where the position pointed at by the hand controller 320 is determined in operation 711 to be included in the field of view, the electronic device 700 may control the display based on the second data received from the hand controller 320. The second data may include various input values for controlling the operation of the display as well as the data obtained by the sensor of the hand controller 320. For example, the electronic device 700 may receive the second data including the input value obtained by pressing the trigger button and select an object in the field of view corresponding to the position pointed at by the hand controller 320. When operation 713 is complete, the electronic device 700 may move along the arrow 714 to be able to receive new sensing data and input data from the HMD 310 and the hand controller 320.

In operation 750, unless the position pointed at by the hand controller 320 is determined in operation 711 to be included in the field of view, the electronic device 700 may control the display based on the first data received from the HMD 310. For example, the electronic device 700 may receive the first data including the input value obtained by touching the touch panel and execute an object in the field of view corresponding to the position pointed at by the HMD 310. When operation 715 is complete, the electronic device 700 may move along the arrow 716 to be able to receive new sensing data and input data from the HMD 310 and the hand controller 320.

Figure 8:
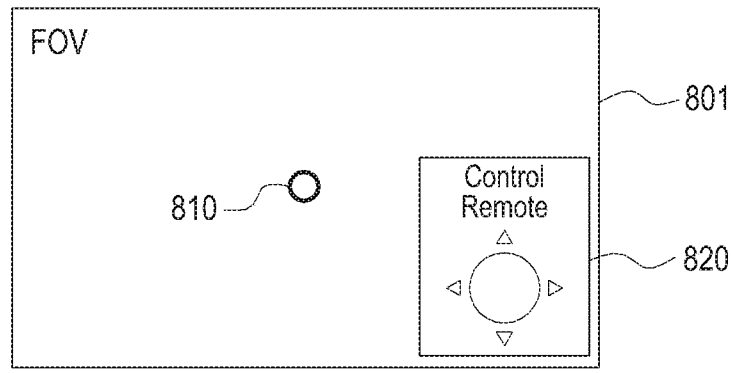
FIG. 8 is a view illustrating a display screen in which an electronic device induces a button of a hand controller among a plurality of controllers to be used when the hand controller falls outside a field of view according to an embodiment of the disclosure.

FIG. 8 is a view illustrating a display screen in which an electronic device induces a button of a hand controller among a plurality of controllers to be used when the hand controller falls outside a field of view according to an embodiment of the disclosure.

Referring to FIG. 8, when the position pointed at by the hand controller falls outside the field of view in the display screen 801, the electronic device 200 may control the display, such as enabling the HMD to point within the field of view. According to an embodiment of the disclosure, where the HMD has a display control right, the electronic device 200 cannot use the hand controller to point at an object in the field of view, nor can it use the button of the hand controller. Referring to FIG. 8, illustrating the situation where the HMD has the display control right, the electronic device 200 may display a pointer 810 for the HMD based on the direction in which the HMD points.

According to an embodiment of the disclosure, where the position pointed at by the hand controller falls outside the field of view, although the hand controller cannot point at an object in the field of view, the electronic device 200 may control the display using, e.g., a button included in the hand controller. For example, the electronic device 200 may turn up the sound volume in the VR space by selecting an object corresponding to the position pointed at by the HMD and pressing up the volume button of the hand controller. Or, the object selected by the HMD may be executed by pressing the trigger button of the hand controller. According to an embodiment of the disclosure, the hand controller 320 may define various functions corresponding to various buttons included in the hand controller or may allow other functions to correspond thereto depending on the characteristics of the object being displayed. According to an embodiment of the disclosure, the electronic device 200 may provide various pieces of information for manipulating the buttons of the hand controller depending on the characteristics of the object being displayed and the characteristics of the object pointed at. According to an embodiment of the disclosure, the electronic device 200 may display information (e.g., a four-direction key menu icon 820) to induce the user to use an available button of the hand controller in the field of view. Referring to FIG. 8, the electronic device 200 may display, as the icon 820, its possibility of turning the volume up or down using the up and down buttons of the four direction buttons, turning the channel to the prior or next channel using the left and right buttons of the four direction buttons, and executing using the center button at the center of the four direction buttons.

Figure 9:
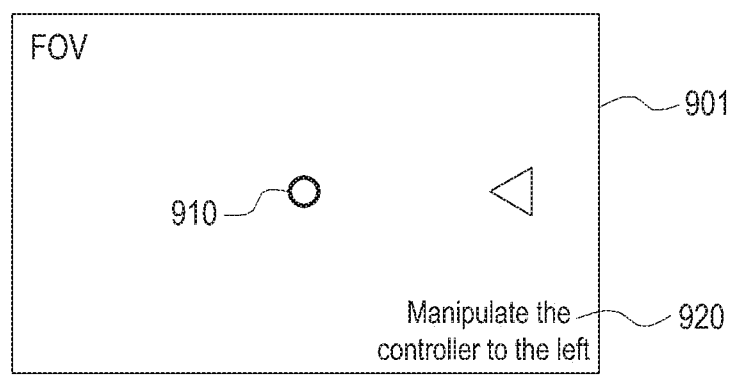
FIG. 9 is a view illustrating a display screen in which an electronic device induces a hand controller, which is out of a field of view, to be moved according to an embodiment of the disclosure.

FIG. 9 is a view illustrating a display screen in which an electronic device induces a hand controller, which is out of a field of view, to be moved according to an embodiment of the disclosure.

Referring to FIG. 9, when the position pointed at by the hand controller falls outside the field of view, the electronic device 200 may control the display, such as pointing at an object within the field of view using the HMD. Referring to FIG. 9, a pointer 910 for the HMD may be displayed within the field of view 901.

Figure 10:
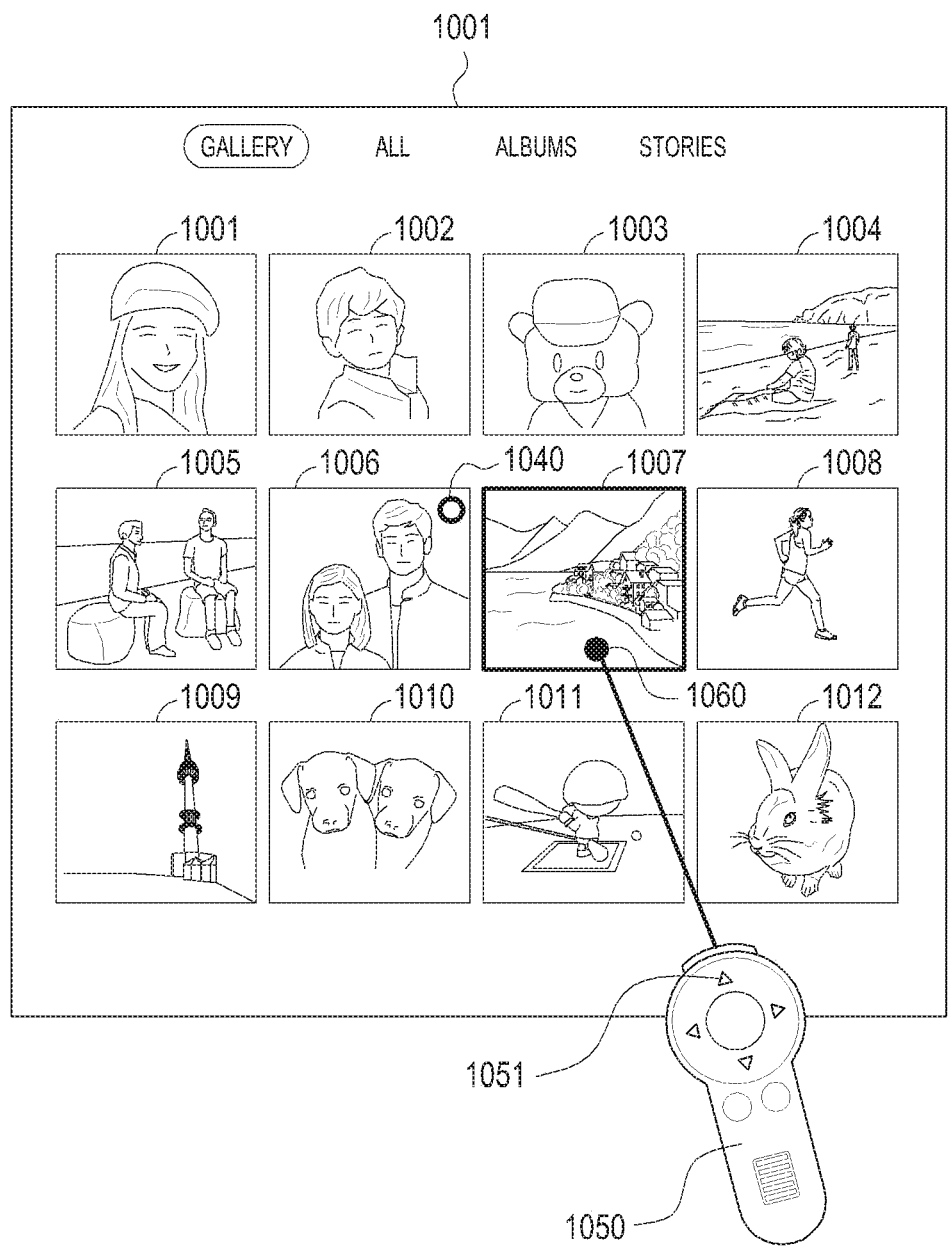
FIGS. 10, 11, and 12 are views illustrating an example in which an electronic device manipulates a display screen using a plurality of controllers according to various embodiments of the disclosure.
Figure 11:
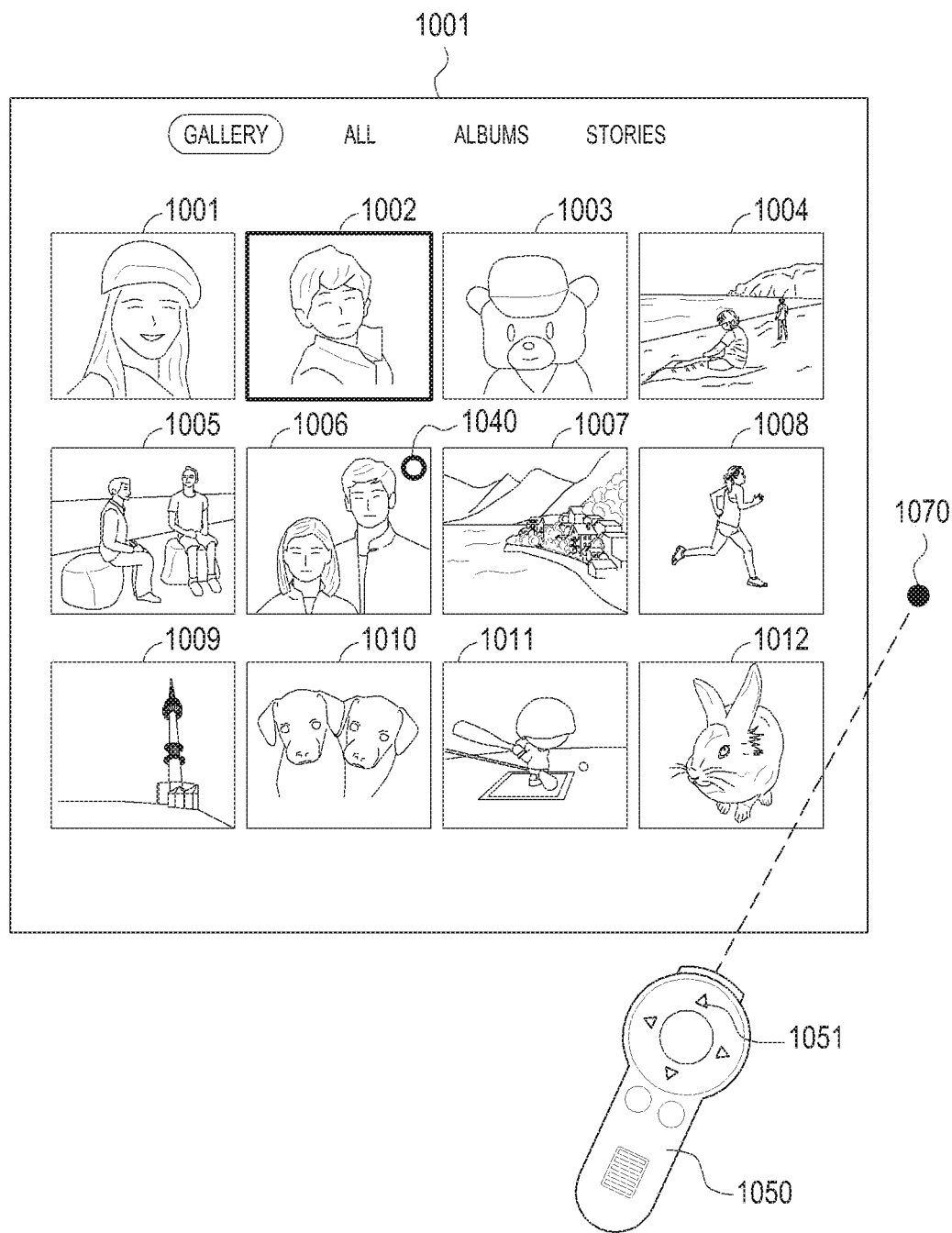

According to an embodiment of the disclosure, where the position pointed at by the hand controller falls outside the field of view 901, the electronic device 200 may point at a particular position in the VR space outside the field of view using the hand controller. For example, where the hand controller may point at any position within the VR space and the position pointed at is within the field of view, the electronic device 200 may display the position pointed at by the hand controller, and where the position pointed at is outside the field of view, the electronic device 200 cannot display the position pointed at by the hand controller. According to an embodiment of the disclosure, referring to FIG. 9, the electronic device 200 may display a guide message 920 to allow the hand controller to move inside the field of view based on the position of the hand controller. For example, assuming that the current position of the hand controller is positioned on the right side of the field of view, the electronic device 200 may provide the user with information that allows the position pointed at by the hand controller to move within the field of view by moving left the hand controller. According to an embodiment of the disclosure, the electronic device 200 may display on a right side in the field of view a message 920 saying, "manipulate the controller to the left," as shown in FIG. 9. Such displaying may be performed in other different manners according to an embodiment of the disclosure. According to an embodiment of the disclosure, the electronic device 200 may control the operation of the display using a plurality of controllers, and each controller may perform manipulations using the buttons or touch pad of the controller as well as pointing at a particular position in the VR space depending on the position and direction (angle) of the controller. FIGS. 10 and 11 are views illustrating examples in which the electronic device 200 manipulates a display screen of a photo gallery using a plurality of controllers together, according to an embodiment of the disclosure.

Figure 12:
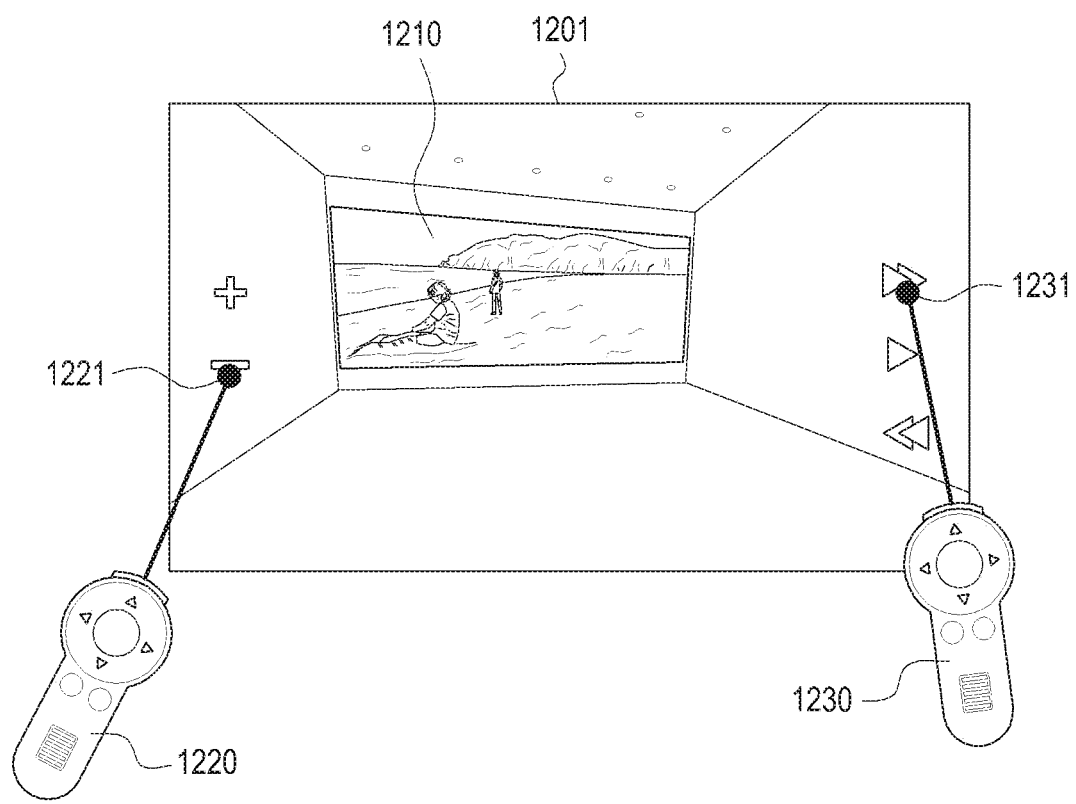

FIGS. 10, 11, and 12 are views illustrating an example in which an electronic device manipulates a display screen using a plurality of controllers according to various embodiments of the disclosure.

Referring to FIG. 10, the electronic device (e.g., the electronic device 200 of FIG. 2) may display a photo gallery including a plurality of photo data items 1001 to 1012 in the field of view and may point at a photo data item using the hand controller 1050. According to an embodiment of the disclosure, the electronic device 200 may point at each photo data item using the controller, selecting the corresponding photo data item. The electronic device 200 may enlarge the photo data item to allow the user to view the enlarged photo or may change the photo list displayed in the field of view. According to an embodiment of the disclosure, the electronic device 200 may control the operation of the display by an input device, such as the buttons of the controller, as well as manipulating the position pointed at by the controller. For example, the electronic device 200 may turn up the sound volume being played by pressing up the volume button of the hand controller or turn down the sound volume by pressing down the volume button. According to an embodiment of the disclosure, diversified numbers, types, or corresponding functions may be defined for the buttons of the controller in the electronic device 200. Referring to FIG. 3B, the hand controller 320 may include a plurality of buttons having various functions, such as a home button, a cancel button, trigger button, or sound volume button.

According to an embodiment of the disclosure, FIG. 10 illustrates an electronic device (e.g., the electronic device 200 of FIG. 2) in which where the user uses the HMD and the hand controller, the position 1060 pointed at by the hand controller is within the field of view. According to an embodiment of the disclosure, an object 1007 in the field of view may be pointed at depending on the position 1060 pointed at by the hand controller 1050 of the position 1040 pointed at by the HMD (not shown) and the position 1060 pointed at by the hand controller 1050. In this case, the electronic device 200 may use an input value for a button of the hand controller to execute a function predefined for the corresponding button. For example, the sound volume being played may be adjusted by pressing the volume button 1051 of the hand controller.

Referring to FIG. 11, where the user uses the HMD and the hand controller, the electronic device (e.g., the electronic device 200 of FIG. 2) may determine that the position 1070 pointed at by the hand controller falls outside the field of view 1001 and may point at an object in the field of view by the HMD. According to an embodiment of the disclosure, the electronic device 200 may manipulate the display using the buttons of the hand controller. According to an embodiment of the disclosure, the electronic device 200 may display messages for the buttons in the field of view to induce the user to use the buttons of the hand controller. Referring to FIG. 11, the electronic device 200 may display a message indicating that the volume button may shift the photo data item displayed up or down, and the channel button may shift the photo data item left or right. Where the position pointed at by the hand controller falls off the field of view while the user wears the HMD and uses the hand controller, the electronic device 200 may identify the function for the button displayed in the field of view and manipulate the button of the hand controller to control the operation of the display. For example, referring to FIG. 11, the electronic device 200 may control the operation of the display to shift from the photo data item currently selected to the photo data item thereabove by pressing the volume button 1051 of the hand controller 1050.

According to an embodiment of the disclosure, the electronic device 200 may set different definitions for the buttons of the hand controller depending on the features of the VR space provided to the user, leading the user to use the buttons. For example, the electronic device 200 may previously define a menu used for each game stage of a game application for each button of the hand controller in the VR space where the game application is being executed and may display the menu in the field of view, thereby allowing the user to perceive newly defined functions as well as the functions predefined for the buttons of the hand controller and to use the buttons.

Referring to FIG. 12, an example is illustrated in which an electronic device (e.g., the electronic device 200 of FIG. 2) manipulates a display screen using a plurality of controllers (e.g., the HMD 310 or hand controller 320 of FIG. 2), according to an embodiment of the disclosure. The plurality of controllers may include an HMD and a hand controller or several other controllers. According to an embodiment of the disclosure, the electronic device 200 may control the operation of the display using one HMD and two hand controllers.

According to an embodiment of the disclosure, where the user wears the HMD and holds the hand controllers in her hands, the electronic device 200 may point at an object displayed based on the HMD and the two hand controllers. For example, where the position pointed at by the left-hand controller and the position pointed at by the right-hand controller are in the field of view, the electronic device 200 may control the operation of the display using the left-hand controller and the right-hand controller, of the HMD, the left-hand controller, and the right-hand controller, but cannot point at an object in the field of view using the HMD.

Referring to FIG. 12, the electronic device 200 may select a menu icon using the hand controllers in the VR space where a video is played, select a volume menu 1221 for the video 1210 displayed in the field of view 1201 using the left-hand controller 1220, and select an execution menu 1231 using the right-hand controller 1230.

According to an embodiment of the disclosure, where the left-hand controller and the right-hand controller are used together, and the position pointed at by the left-hand controller is determined to fall outside the field of view, the electronic device 200 cannot control the operation of the display using the left-hand controller. As another example, upon determining that the position pointed at by the right-hand controller falls outside the field of view, the electronic device 200 cannot control the operation of the display using the right-hand controller. Where there are multiple hand controllers, the electronic device 200 may assign a control right to each hand controller depending on where the position pointed at by each hand controller is within the field of view. Where the positions pointed at by the two hand controllers fall outside the field of view, the electronic device 200 may point at an object in the field of view using the HMD. For example, where such a manipulation is possible as to plant and water a crop object without a game character entering and moving in a predetermined game space in a game execution screen, the electronic device 200 may display messages to exemplify the operation of planting crops corresponding to a first button and to exemplify the operation of watering the crops corresponding to a second button.

Figure 13A:
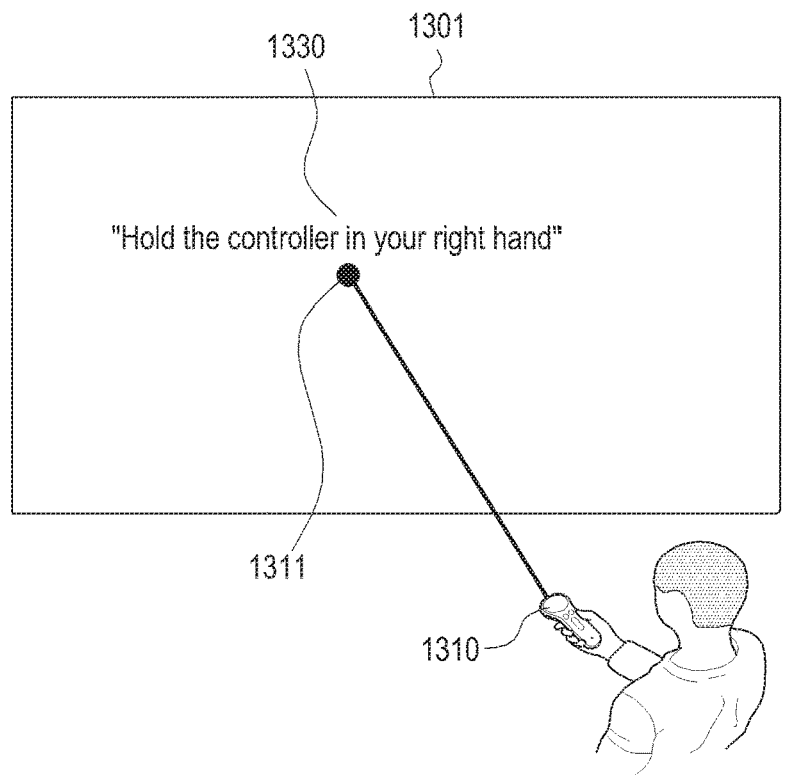
FIGS. 13A and 13B are views illustrating an example in which an electronic device identifies a right-hand controller or a left-hand controller according to an embodiment of the disclosure.
Figure 13B:
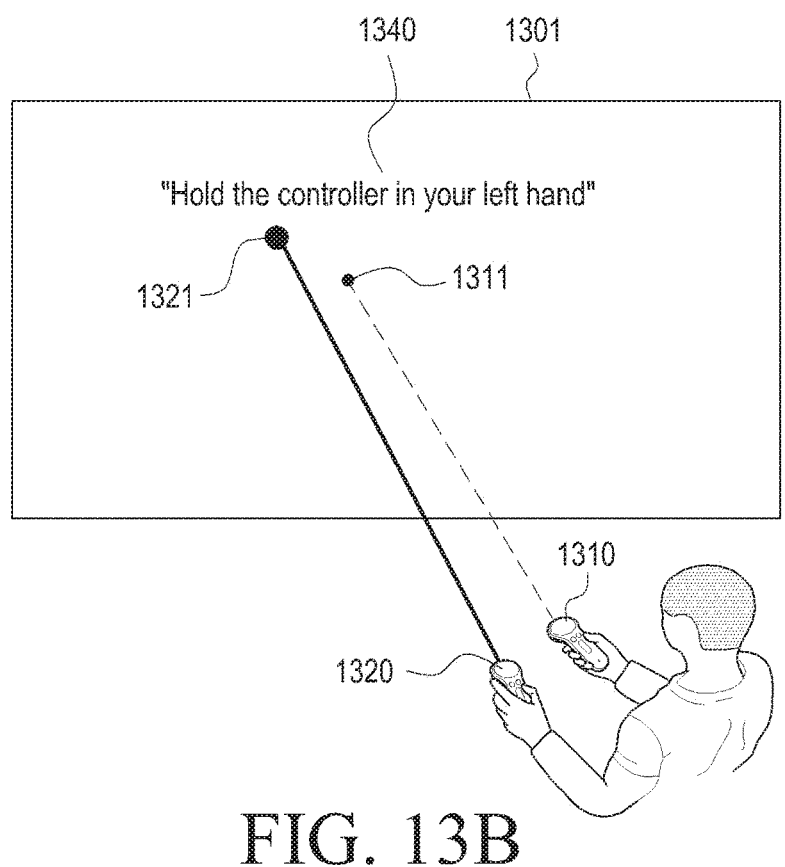

FIGS. 13A and 13B are views illustrating an example in which an electronic device identifies a right-hand controller or a left-hand controller according to an embodiment of the disclosure.

Referring to FIGS. 13A and 13B, an example is illustrated in which an electronic device (e.g., the electronic device 200 of FIG. 2) identifies a right-hand controller or a left-hand controller according to an embodiment of the disclosure. According to an embodiment of the disclosure, the electronic device 200 may control the operation of the display using two hand controllers. The electronic device 200 may provide the user with a guide message to identify the two hand controllers and may determine that a controller sensed is the one as per the guide message.

Referring to FIG. 13A, the electronic device 200 may control the display to display a guide message 1330 saying, "Hold the controller in your right hand," in the field of view 1301. When the user holds a first controller 1310 in her right hand according to the guide message 1330 displayed on the display, the first controller 1310 may transmit data obtained by a sensor of the first controller 1310 to the electronic device 200. The electronic device 200 may identify the first controller 1310 based on the received sensor data and determine that the first controller 1310 is the right-hand controller.

FIG. 13B assumes the scenario in which the user holds the first controller 1310 in her hand while pointed at position 1311. According to an embodiment of the disclosure, the electronic device 200 may control the display to display a guide message 1340 saying, "Hold the controller in your left hand," in the field of view 1301. When the user holds a second controller 1320 in her left hand according to the guide message displayed on the display, the second controller 1320 may transmit data obtained by a sensor of the second controller 1320 to the electronic device 200. The electronic device 200 may identify the second controller 1320 based on the received sensor data and determine that the identified second controller 1320 is the left-hand controller while pointed at position 1321.

According to an embodiment of the disclosure, where a plurality of users use their respective controllers to control a plurality of objects in the field of view, the electronic device 200 may allow the plurality of users to share the same VR space and may display a guide message to identify the controller corresponding to each user. The electronic device 200 may determine that a controller sensed after the guide message is displayed is the controller corresponding to the guide message. Where the plurality of users use the plurality of controllers, the electronic device 200 allows the user to clearly identify each controller by the process of identifying the plurality of controllers. According to an embodiment of the disclosure, various identification values may be defined and used for the plurality of controllers based, at least partially, on the interaction with the user, eliminating the need for setting the controllers to be operated as particular ones in the stage of manufacturing the controllers.

Figure 14:
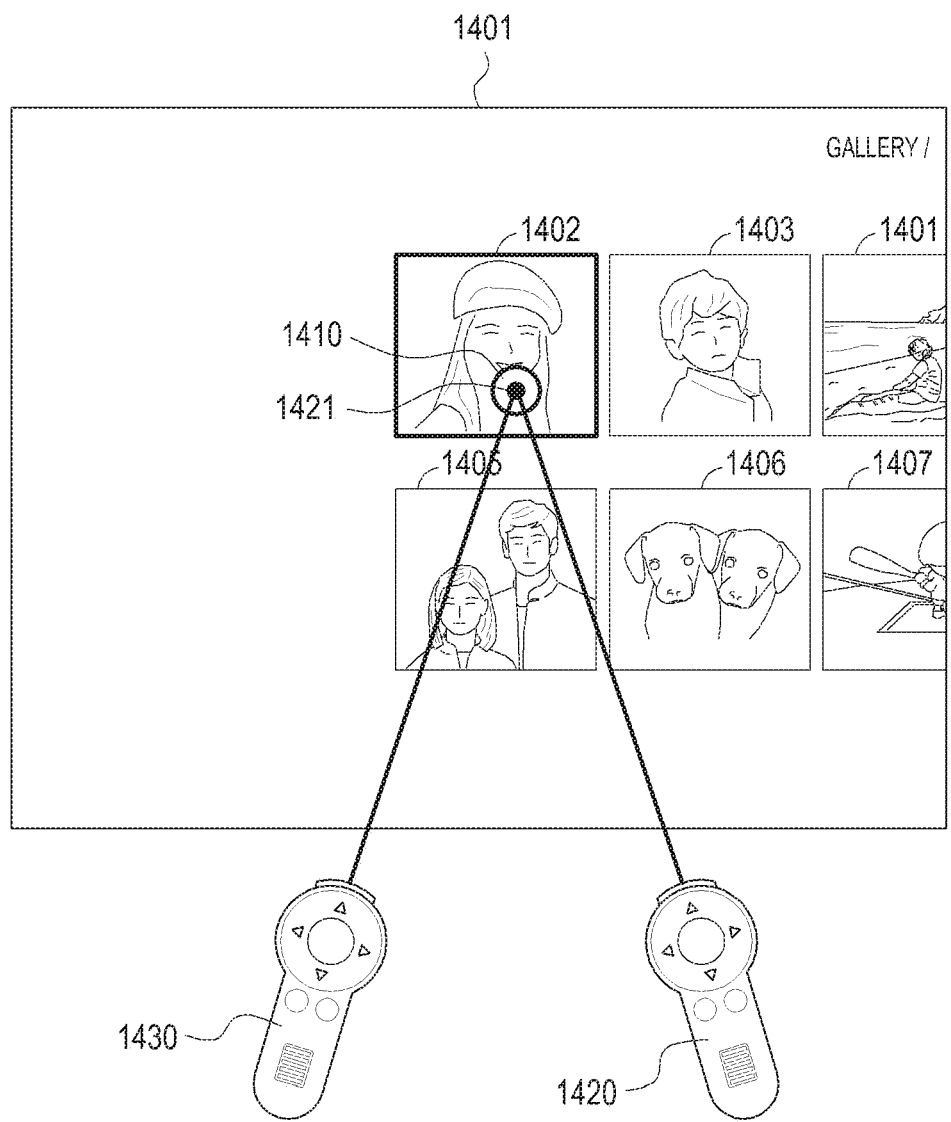
FIG. 14 is a view illustrating an example in which an electronic device selects an object simultaneously using two controllers according to an embodiment of the disclosure.

FIG. 14 is a view illustrating an example in which an electronic device selects an object simultaneously using two controllers according to an embodiment of the disclosure.

Referring to FIG. 14, the electronic device 200 selects an object using a first controller 1420 and a second controller 1430. According to an embodiment of the disclosure, the electronic device 200 may perform various types of control, such as selecting, deleting, or changing an object in the field of view, based on the distance between the positions pointed at by the two controllers. According to an embodiment of the disclosure, the electronic device 200 may point at a first object, among a plurality of objects in the field of view, using a first controller. The electronic device 200 may point at the first object at position 1410 using a second controller. According to an embodiment of the disclosure, in this case, corresponding to the first object being pointed at by the controller, the electronic device 200 may provide the user with a feedback indicating that the first object has been pointed at, such as highlighting and displaying the object.

According to an embodiment of the disclosure, where the distance between the position pointed at by the first controller and the position pointed at by the second controller is within a predetermined threshold, the electronic device 200 may associate the first controller with the second controller to control the operation of the display. Referring to FIG. 12, a field of view 1401 is displayed including objects 1401 to 1407. When the distance between the position 1410 pointed at by the first controller and the position 1421 pointed at by the second controller is within the predetermined threshold, and the object 1402 is simultaneously pointed at by the first controller 1420 and the second controller 1430, the electronic device 200 may "select" the object 1402 corresponding to the operation of the first controller 1420 and the second controller 1430 pointing at the object 1402. According to an embodiment of the disclosure, unlike simply pointing at a particular object, the operation of selecting the particular object may make it possible to move or delete the selected object. For example, where the position pointed at by the first controller, which points at the first object, is moved after the first controller and the second controller are associated with each other, the first object may also be moved as the first controller moves. However, simply pointing at the first object, the electronic device 200 may point at, highlight, and display the object corresponding to the position shifted as the first controller moves. For example, the electronic device 200 may display the object 1402 in a thick-bordered box, unlike the object 1403, as shown in FIG. 14.

Figure 15A:
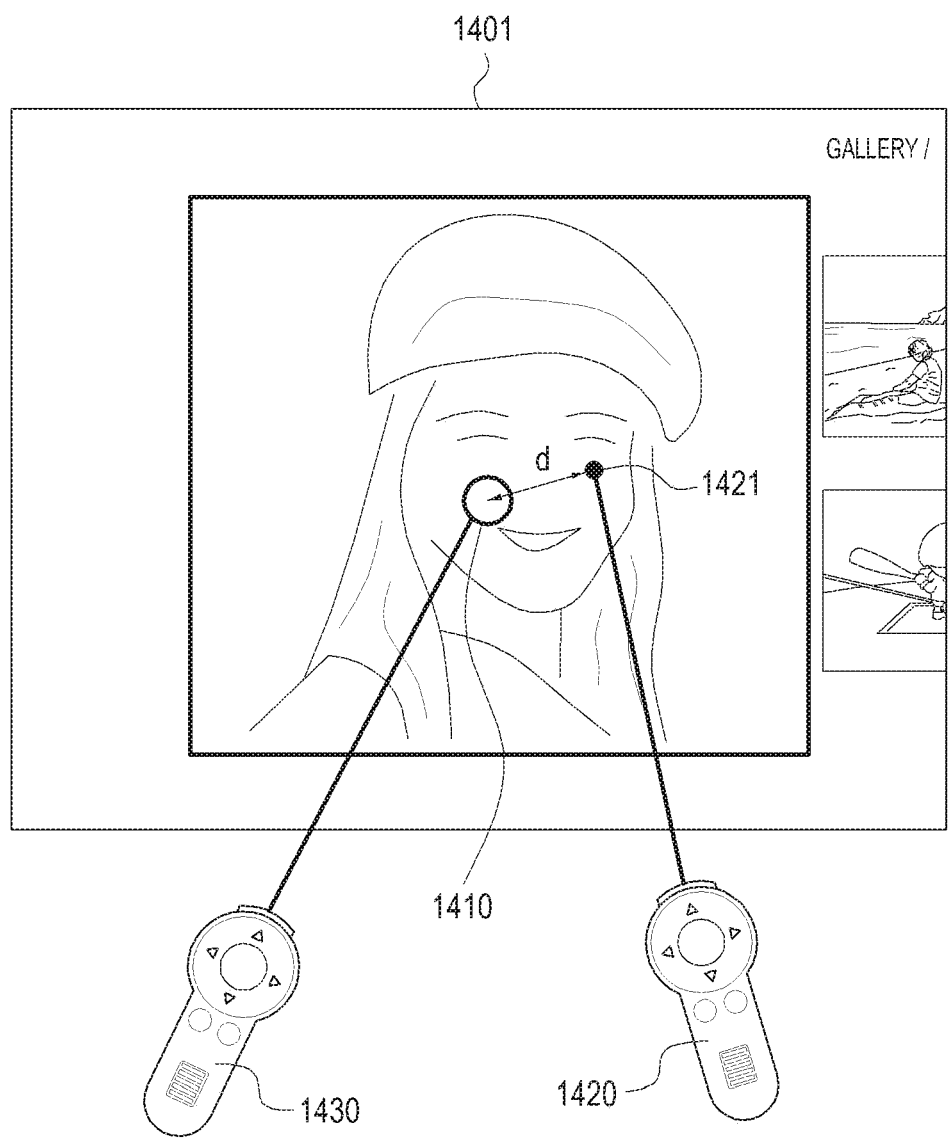
FIG. 15A is a view illustrating an example in which an electronic device enlarges a selected object using two controllers according to an embodiment of the disclosure.

FIG. 15A is a view illustrating an example in which an electronic device enlarges a selected object using two controllers (e.g., the first controller 1420 or the second controller 1430) according to an embodiment of the disclosure.

Figure 15B:
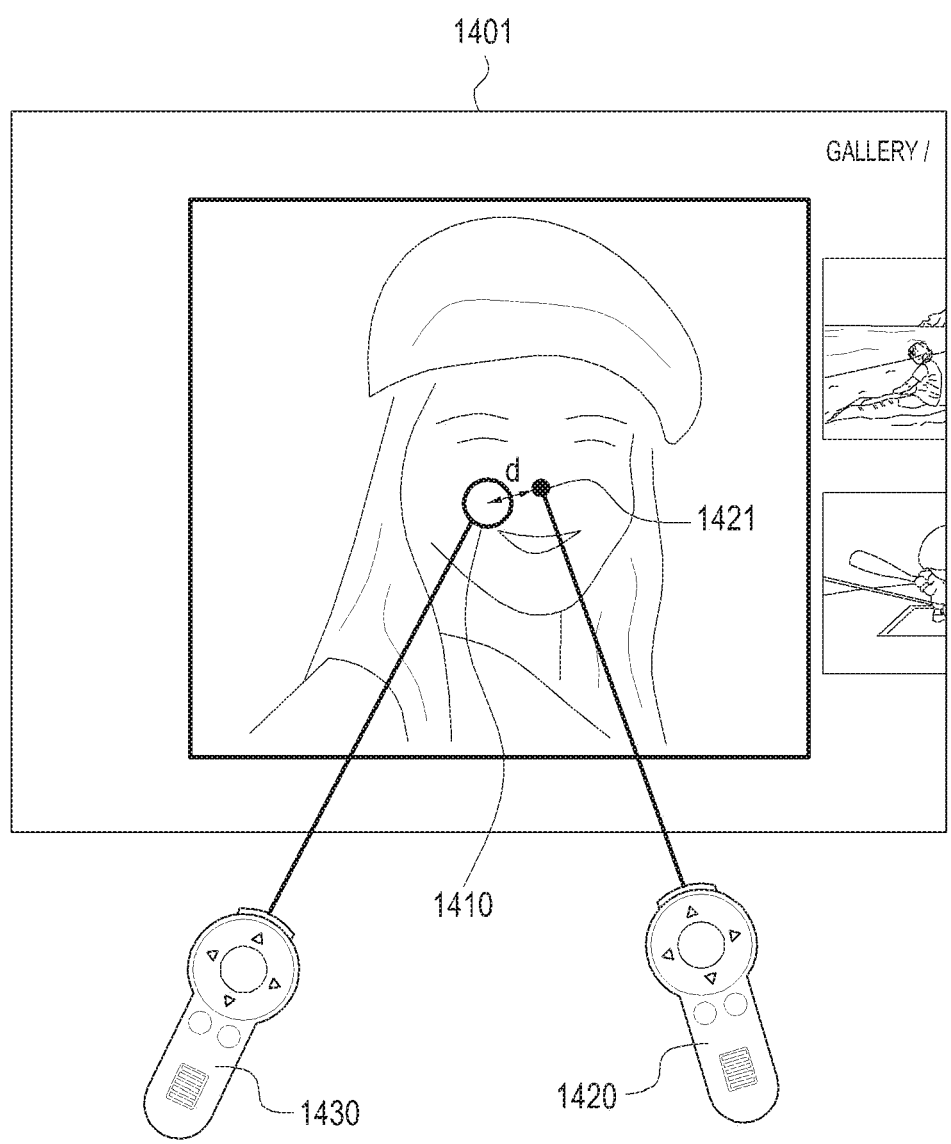
FIG. 15B is a view illustrating an example in which an electronic device shrinks a selected object using two controllers according to an embodiment of the disclosure.

FIG. 15B is a view illustrating an example in which an electronic device shrinks a selected object using two controllers according to an embodiment of the disclosure.

Referring to FIGS. 15A and 15B, where the distance between the positions pointed at by the first controller and the second controller is within a threshold, the electronic device 200 may associate the two controllers with each other and control the operation of the display. As described above in connection with FIG. 14, where the first controller and the second controller both point at the first object in which case the distance between the positions pointed at by the first and second controllers is within the threshold, the electronic device 200 may "select" the first object. According to an embodiment of the disclosure, after the first controller is associated with the second controller, the electronic device 200 may associate the operation of the first controller with the operation of the second controller, controlling the operation of the display. For example, it is assumed in FIG. 15A that the first controller and the second controller simultaneously point at the first object 1402 to select the first object 1402. Where the first controller moves left, and the second controller moves right, i.e., in the opposite direction of the first controller, the electronic device 200 may determine that the first controller and the second controller move away from each other. Where the first controller and the second controller move away from each other so that the distance d between the first controller and the second controller increases, the electronic device 200 may enlarge (e.g., zoom in) and display the selected first object. For example, where the user pinches out with her two fingers on the touchscreen, the same operation as the touched object is enlarged may be performed.

Referring to FIG. 15B, where the first controller moves right, and the second controller moves left, i.e., the opposite direction of the first controller, with the first object enlarged, as described in connection with FIG. 15A, the electronic device 200 may determine that the first controller and the second controller come close to each other. Where the first controller and the second controller come close to each other so that the distance d between the first controller and the second controller decreases, the electronic device 200 may shrink (e.g., zoom out) and display the selected first object. According to an embodiment of the disclosure, the electronic device 200 may gradually shrink and display the first object based on the distance between the first controller and the second controller. For example, where the user pinches in with her two fingers on the touchscreen, the same operation as the touched object is shrunken may be performed.

According to an embodiment of the disclosure, where the distance between the first controller and the second controller is within the threshold, the operations of the first controller and the second controller may be determined in association with each other, and the electronic device 200 may apply various operations corresponding to the associated operations. For example, where the distance between the first controller and the second controller increases as shown in FIG. 15A, the electronic device 200 may enlarge the object. Where the distance between the first controller and the second controller decreases as shown in FIG. 15B, the electronic device 200 may shrink the object. Where the first controller and the second controller move with the distance between the first controller and the second controller maintained, the electronic device 200 may move the object.

Figure 16:
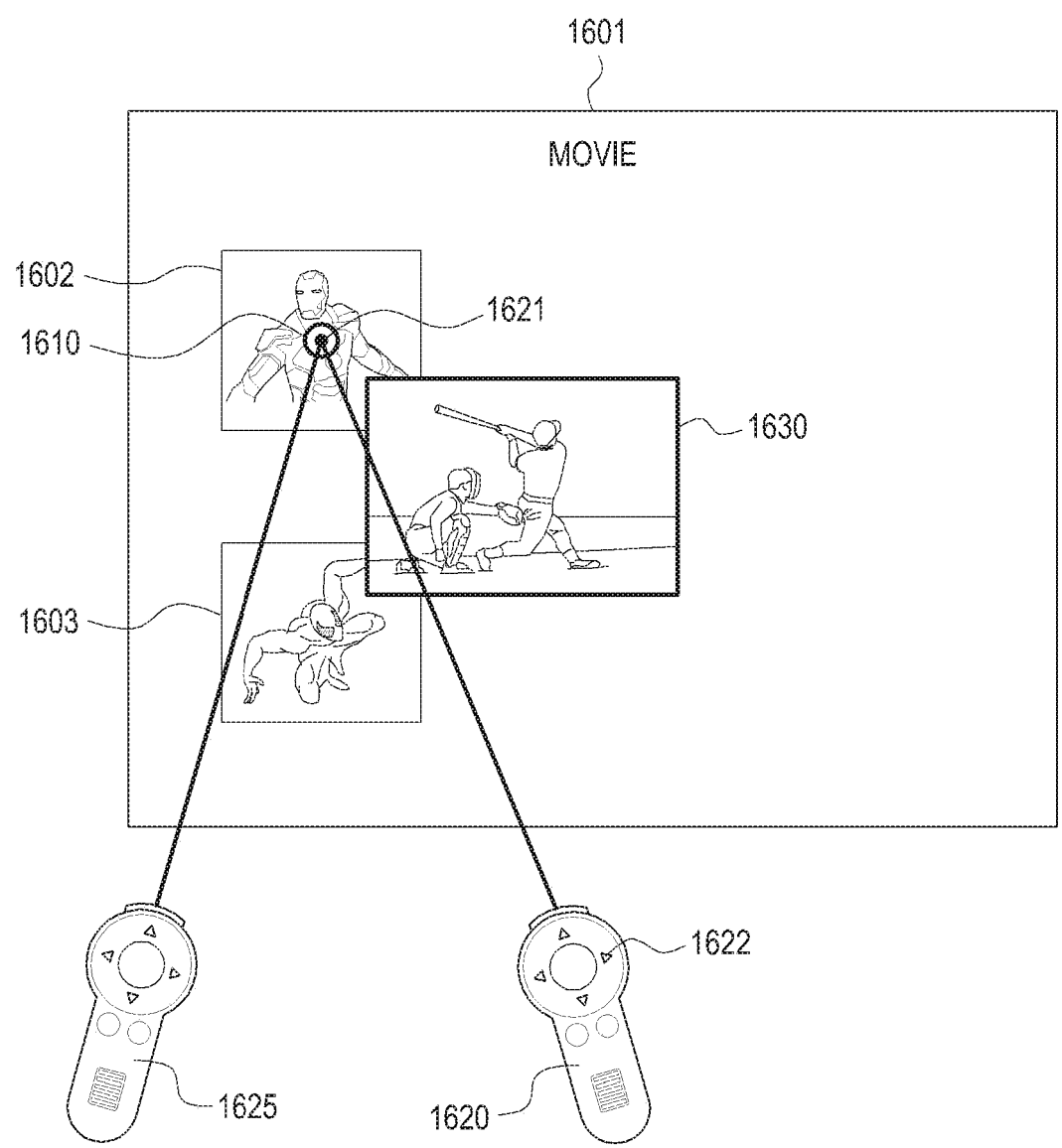
FIG. 16 is a view illustrating an example in which an electronic device selects an object using two controllers according to an embodiment of the disclosure.

FIG. 16 is a view illustrating an example in which an electronic device selects an object using two controllers according to an embodiment of the disclosure.

Referring to FIG. 16, an electronic device is configured to select an object using a first controller 1620 or a second controller 1625. According to an embodiment of the disclosure, where the distance between the position pointed at by the first controller and the position pointed at by the second controller is within a predetermined threshold, the electronic device 200 may associate the operation of the first controller with the operation of the second controller to make a determination. As noted above with reference to FIG. 14, an embodiment in which an object may be operated differently between when the object is pointed at by one controller and when the object is pointed at by two controllers. According to an embodiment of the disclosure, the electronic device 200 may select an object using one controller, and where the selected object is a media file (e.g., a video file), the electronic device 200 may execute the selected object by a predetermined operation. For example, where the first controller 1620 points at a first movie 1602, of the first movie 1602 and a second movie 1603 displayed on the display screen 1601, and the "run" button of the first controller 1620 is pressed, the electronic device 200 may perform control to play the first movie 1602. According to an embodiment of the disclosure, where the two controllers select an object in association with each other and an operation defined for the selected object is performed, the electronic device 200 may execute it in the form of a preview. For example, where the first controller 1620 points at position 1610 and the second controller 1625 points at 1621, which are within a predetermined distance from each other to select the first movie 1602, and the "run" button 1622 of the first controller 1620 or the second controller 1625 is pressed, the electronic device 200 may execute the first movie 1602 in a preview by generating a predetermined size of sub window 1630 for the first movie 1602 and playing the first movie 1602 in the sub window 1630.

According to an embodiment of the disclosure, the electronic device 200 may apply different display operations between when moving one controller or pressing the button and when moving the two controllers in association with each other or pressing the button to operations of the display (e.g., the selected object) defined corresponding to the movement of the controllers and the input of the buttons of the controllers.

Figure 17:
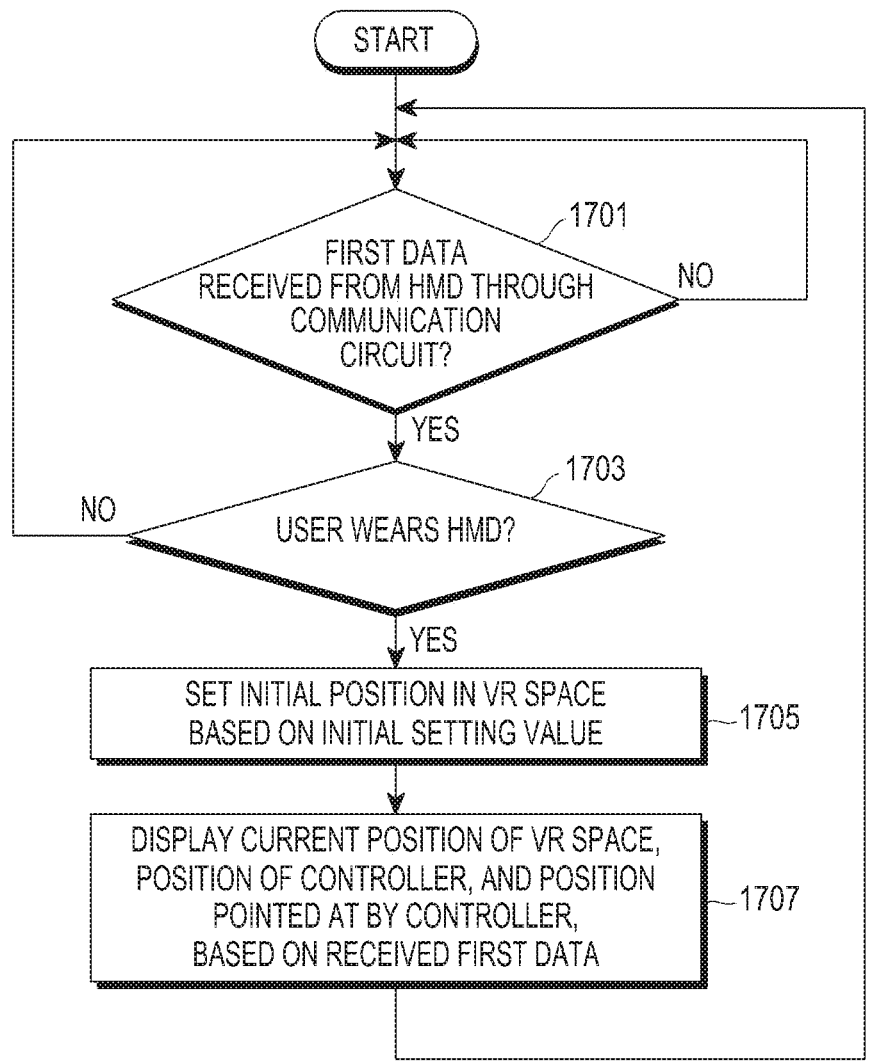
FIG. 17 is a flowchart illustrating a method by which an electronic device displays a field of view using an HMD according to an embodiment of the disclosure.

FIG. 17 is a flowchart illustrating a method by which an electronic device displays a field of view using an HMD according to an embodiment of the disclosure.

Referring to FIG. 17, in operation 1701, the electronic device 200 (or the processor 210) may receive first data from the HMD through the communication circuit. The first data may include data obtained by the sensor of the HMD, e.g., data obtained by the proximity sensor of the HMD or data obtained by the IMU of the HMD.

In operation 1703, the processor 210 may determine whether the user wears the HMD based on the received first data. According to an embodiment of the disclosure, where the data obtained by the proximity sensor of the HMD in the first data is a predetermined threshold or less, the processor 210 may determine that the user wears the HMD, and where the data obtained by the proximity sensor of the HMD exceeds the predetermined threshold, the processor 210 may determine that the user does not wear the HMD. The predetermined threshold may be experimentally determined. Where the user is determined to wear the HMD, the processor 210 may perform operation 1705, and where the user does not wear the HMD, the processor 210 may repeat operation 1701.

In operation 1705, the processor 210 may set an initial position for the VR space based on an initial setting value. The initial setting value may be, e.g., the latest position referenced in the VR space or a predetermined start position in the VR space. According to an embodiment of the disclosure, the processor 210 may display a field of view in the VR space on the display with respect to the initial position in the VR space.

In operation 1707, the processor 210 may display the current position in the VR space, the position of the controller, and the position pointed at by the controller, based on the received first data. After displaying the HMD in the VR space based on data received from the HMD, the processor 210 waits to receive new data from the HMD.

Figure 18B:
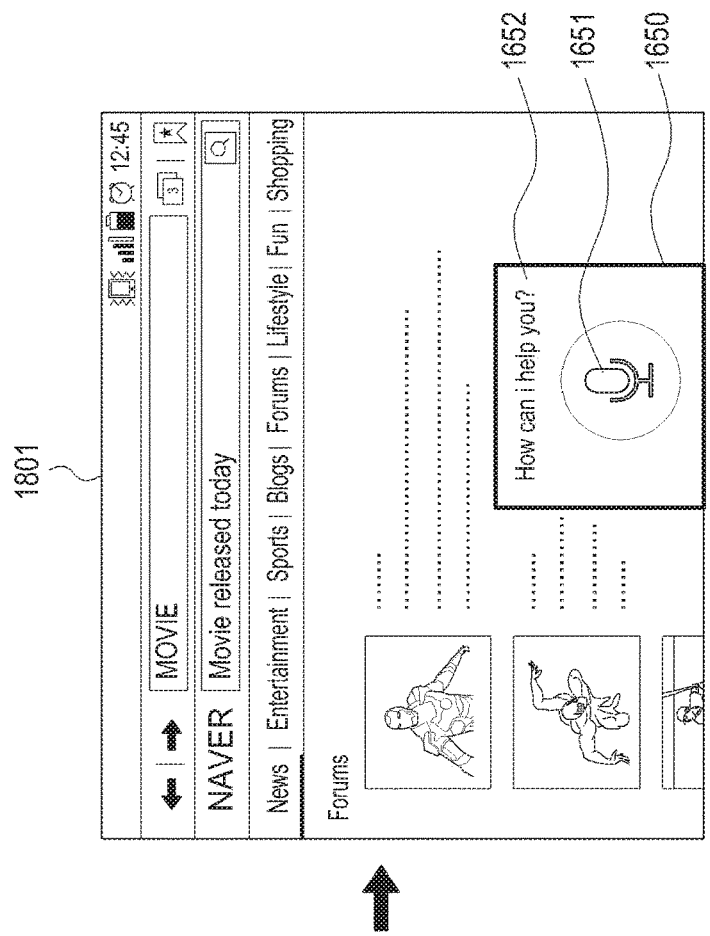
FIGS. 18A and 18B are views illustrating examples in which an electronic device is operated by a voice command according to various embodiments of the disclosure.
Figure 18A:
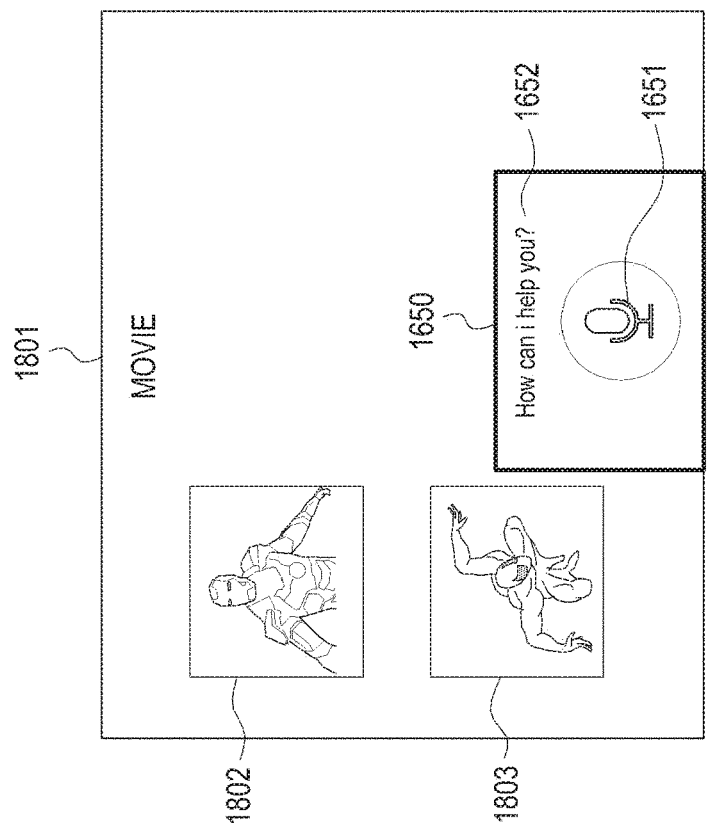

FIGS. 18A and 18B are views illustrating examples in which an electronic device is operated by a voice command according to various embodiments of the disclosure.

According to an embodiment of the disclosure, the electronic device 200 may control the operation of the display using a plurality of controllers. According to an embodiment of the disclosure, the electronic device 200 may control the operation of the display based on data received from the input devices of the plurality of controllers. For example, among the plurality of controllers, the first controller may include a microphone, and the electronic device 200 may control the operation of the display corresponding to a voice command input to the microphone.

According to an embodiment of the disclosure, when the position of the first controller falls within a predetermined range, the electronic device 200 may control the display to display the predetermined range in the field of view and display a guide message operable by the voice command.

Referring to FIG. 18A, the electronic device 200 may display a plurality of objects 1802 and 1803 in the field of view and a microphone icon 1651 and a text message 1652 saying, "How can I help you?" in a portion 1650 of the field of view. The electronic device 200 may provide the microphone icon 1651 and the text message 1652 to induce the user to issue a voice command and may receive the voice command input to the microphone of the first controller. For example, where the user inputs a voice saying, "Look up new move releases today!" to the microphone of the first controller, the electronic device 200 may search for "movies to be released today" using an internet application, according to an embodiment of the disclosure.

Referring to FIG. 18B, according to an embodiment of the disclosure, the electronic device 200 may display an execution screen 1801 of the internet application that displays the results of searching for the move releases on the day.

According to an embodiment of the disclosure, the predetermined range where voice commands are available may be set as an area closest to the user's mouth in the VR space. Where the first controller is a hand controller, when the user manipulates the first controller in her hand, the electronic device 200 may specify a portion of the VR space corresponding to the user's mouth, and where the position of the first controller is included in the specified portion, the electronic device 200 may determine that the user has brought the first controller close to her mouth. According to an embodiment of the disclosure, the electronic device 200 may induce operations and provide functions, organically corresponding to the user's manipulation of the controller, thereby increasing user convenience.

Figure 19:
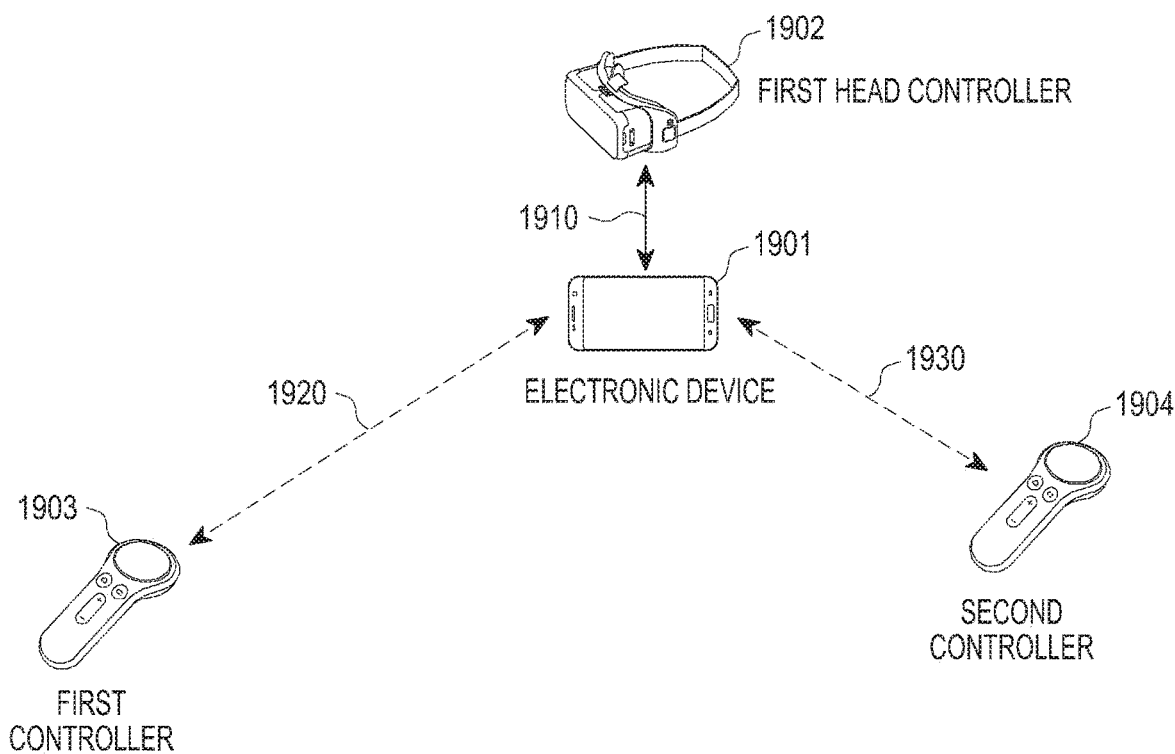
FIG. 19 is a view illustrating an example in which an electronic device assigns a right to control display to a plurality of controllers based on a physical position according to an embodiment of the disclosure.

FIG. 19 is a view illustrating an example in which an electronic device assigns a right to control display to a plurality of controllers based on a physical position according to an embodiment of the disclosure.

Referring to FIG. 19, an electronic device 1901 may assign a display control right to at least one of a plurality of controllers to control the display screen using the plurality of controllers. According to an embodiment of the disclosure, the plurality of controllers may wirelessly or wiredly be connected with the electronic device. For example, a first head controller 1902 may be connected to the electronic device through a USB as denoted with reference numeral 1910, a first controller 1903 may be connected to the electronic device via BLE communication as denoted with 1920, and a second controller 1904 may be connected to the electronic device via BLE communication as denoted with 1930.

According to an embodiment of the disclosure, the electronic device 1901 may assign the display control right to the controller that is positioned physically closer to the electronic device 1901. For example, the electronic device 1901 may determine the position of the controller based on the strength of wireless communication signals (e.g., radio frequency (RF) signals) for the controllers connected to the electronic device 1901 and assign the display control right to the controller for which the wireless communication signal has the largest strength. As another example, the electronic device 1901 may measure the degree of proximity for at least one or more controllers connected via BLE communication. The electronic device 1901 may assign the display control right to the closest controller according to the BLE communication.

Figure 20:
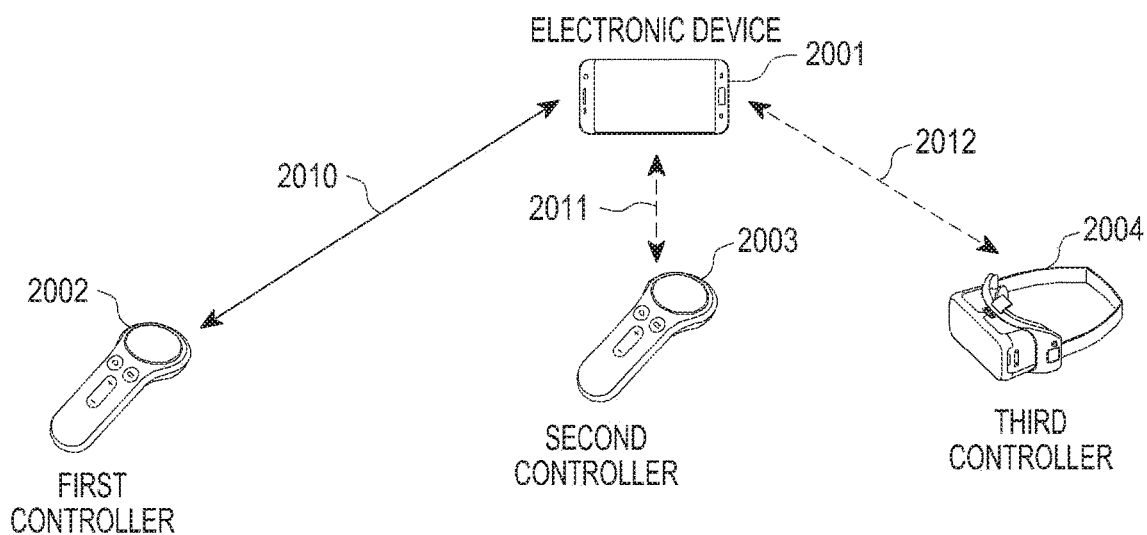
FIG. 20 is a view illustrating an example in which an electronic device assigns a right to control display to a plurality of controllers based on priority according to an embodiment of the disclosure.

FIG. 20 is a view illustrating an example in which an electronic device 2001 (e.g., the electronic device 200) assigns a right to control display to a plurality of controllers based on priority according to an embodiment of the disclosure.

Referring to FIG. 20, an electronic device 2001 may identify priorities set for a plurality of controllers. For example, the electronic device 2001 may identify the respective priorities of the first controller 2002, the second controller 2003, and the third controller 2004 wirelessly or wiredly connected to the electronic device 2001, and upon determining that the priority of the first controller 2002 is highest, the electronic device 2001 may assign the display control right to the first controller 2002. For example, as shown in FIG. 20, the first controller 2002 having the display control right may be denoted in a solid line 2010, and the second controller 2003 and the third controller 2004 which have no display control right may be denoted in dashed lines 2011 or 2012.

According to an embodiment of the disclosure, where the first controller 2002, the second controller 2003, and the third controller 2004 have their priorities in the order thereof, the electronic device 2001 may assign a display control right to the third controller 2004 when only the third controller 2004 is connected to the electronic device 2001, assign a display control right to the second controller 2003 when the second controller 2003 is further connected to the electronic device 2001, and assign a display control right to the first controller 2002 when the first controller 2002 is then connected to the electronic device 2001. The electronic device 2001 may control the display based on the direction that the controller with the display control right indicates.

According to an embodiment of the disclosure, where the order of priority is from the first controller 2002 through the second controller 2003 to the third controller 2004, and the first controller 2002 indicates an outside of the field of view, the electronic device 2001 may assign a display control right to the second controller 2003. For example, the electronic device 2001 may assign a display control right based on whether the plurality of controllers point within the field of view and the priorities of the controllers.

Figure 21:
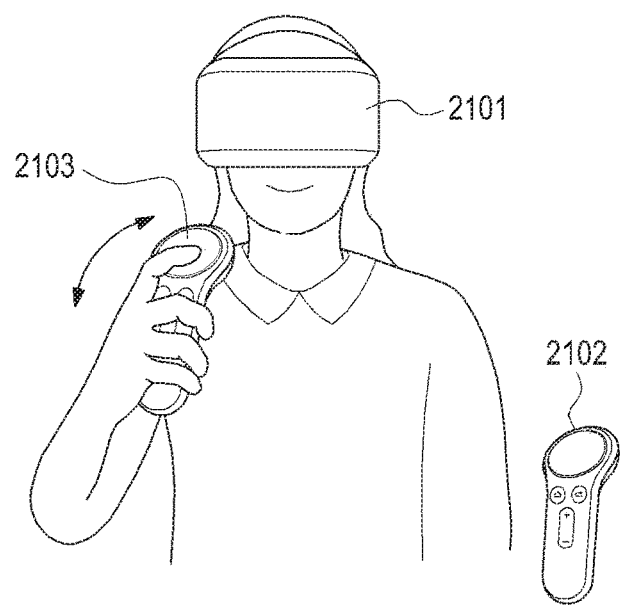
FIG. 21 is a view illustrating an example in which an electronic device assigns a right to control display to a plurality of controllers based on operation of at least one of the plurality of controllers according to an embodiment of the disclosure.

FIG. 21 is a view illustrating an example in which an electronic device assigns a right to control display to a plurality of controllers based on operation of at least one of the plurality of controllers to an embodiment of the disclosure.

Referring to FIG. 21, the electronic device 200 may detect a motion of the user who wears the HMD 2101 and holds the second controller 2103 in her hand without using the first controller 2102 and may assign a display control right to at least one controller among the plurality of controllers. For example, when the user moves her right hand as shown in FIG. 21, the electronic device 200 may sense the motion of the second controller 2103 and assign a display control right to the first controller 2102.

Figure 22:
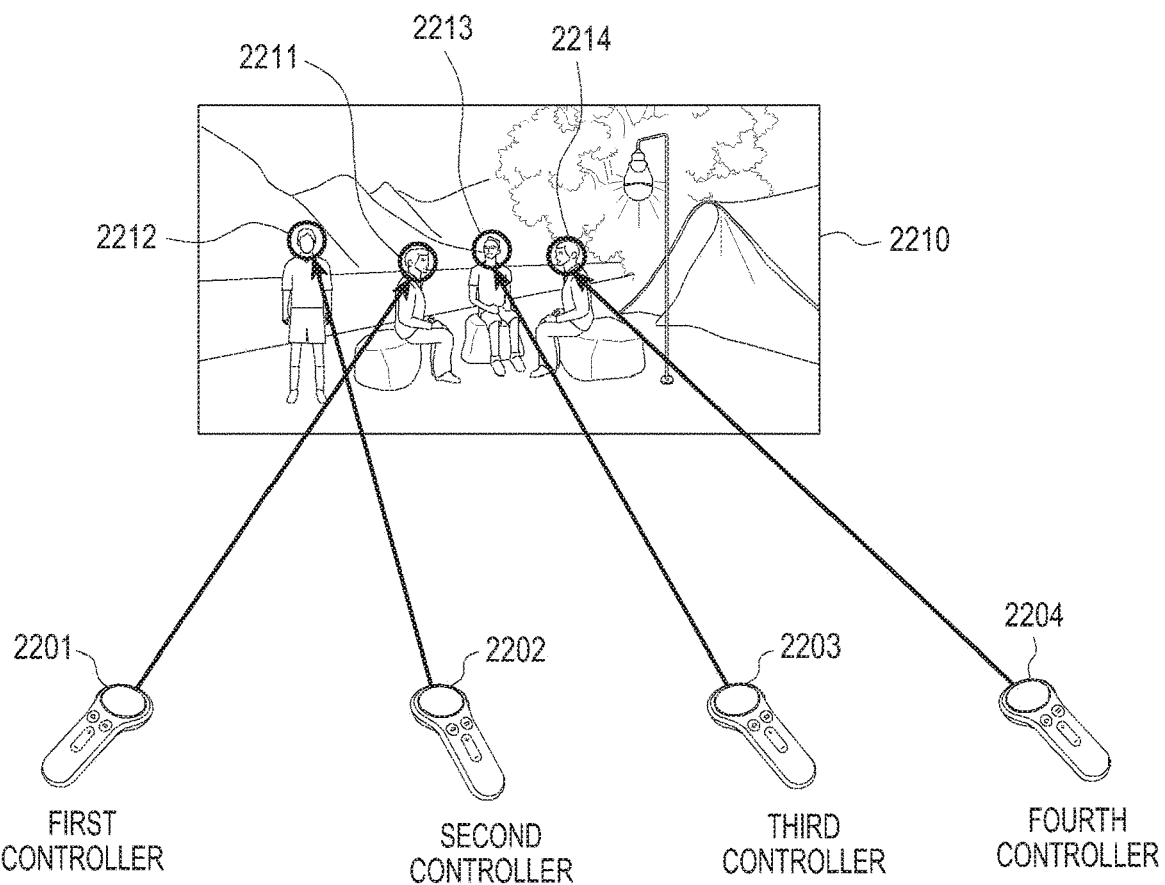
FIG. 22 is a view illustrating an example in which an electronic device performs a plurality of pointing events using a plurality of controllers according to an embodiment of the disclosure.

FIG. 22 illustrates an example in which an electronic device performs a plurality of pointing events using a plurality of controllers according to an embodiment of the disclosure.

Referring to FIG. 22, the electronic device may use a plurality of controllers to control a plurality of functions (or objects) on the display 2210. Referring to FIG. 22, the electronic device 200 may provide a virtual game application that is operated with a plurality of characters and may display an execution screen 2310 of the game application in the field of view. For example, the first controller 2201, the second controller 2202, the third controller 2213, and the fourth controller 2204 may control the first character 2211, the second character 2212, the third character 2213, and the fourth character 2214, respectively. The electronic device 200 may control the first controller 2201 to the fourth controller 2204 so that their respective operations do not conflict with each other.

As is apparent from the foregoing description, according to the embodiments of the disclosure, the electronic device may provide the user with various manipulations to control the display of the electronic device using a plurality of different controllers.

According to the embodiments of the disclosure, the electronic device may reflect the user's intent to assign a right to control the display to at least one of a plurality of controllers.

According to the embodiments of the disclosure, the electronic device may switch and re-assign the right to control the display between the plurality of controllers corresponding to the user's natural manipulation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a display configured to output a screen;
a communication circuit;
at least one processor electrically connected with the display and the communication circuit; and
a memory electrically connected with the at least one processor, wherein the memory stores instructions that configure the at least one processor to:
display, on the screen, a first pointer for a first controller based on first data obtained by a first sensor of the first controller, and
upon determining that a second pointer for a second controller points at the screen based on second data obtained by a second sensor of the second controller while displaying the first pointer for the first controller on the screen, control the display to delete the first pointer from the screen and to display the second pointer for the second controller based on the second data.

2. The electronic device of claim 1, wherein the memory further stores instructions that further configure the at least one processor to receive third data input into the second controller and control a first object indicated by the second pointer among a plurality of objects included in the screen based on the second data and the third data.

3. The electronic device of claim 1, wherein the memory further stores instructions that further configure the at least one processor to, when the first sensor is included in the first controller, receive the first data from the first controller using the communication circuit.

4. The electronic device of claim 3, wherein the memory further stores instructions that further configure the at least one processor to:
receive fourth data input into the first controller, and
when the second pointer for the second controller points to a location outside of the screen, control a second object indicated by the first pointer among a plurality of objects included in the screen based on the first data and the fourth data.

5. The electronic device of claim 4, wherein the memory further stores instructions that further configure the at least one processor to:
receive an input value for a button of the second controller, and
control the second object based on the input value, the first data, and the fourth data.

6. The electronic device of claim 4, wherein the memory further stores instructions that further configure the at least one processor to control the display to display a message to induce the second controller to move on the screen.

7. The electronic device of claim 1, wherein the memory further stores instructions that further configure the at least one processor to:
receive fifth data obtained by a third sensor of a third controller, and
upon determining that a third pointer for the third controller points at the screen based on the fifth data, control the display to display the third pointer on the screen.

8. The electronic device of claim 7, wherein the memory further stores instructions that further configure the at least one processor to:
display information for identifying the second controller or the third controller on the screen,
recognize the second controller upon receiving data from the second controller, and
recognize the third controller upon receiving data from the third controller.

9. The electronic device of claim 1, wherein the first controller or the second controller is configured to be worn on a user's head or held in the user's hand.

10. The electronic device of claim 1,
wherein the memory further stores instructions that further configure the at least one processor to generate a virtual reality (VR) space, and
wherein the screen is a portion of the VR space which is selected based on the first data.

11. The electronic device of claim 10, wherein the memory further stores instructions that further configure the at least one processor to control the display to display a lead line from a position of the second controller to the second pointer in the VR space.

12. The electronic device of claim 10, wherein the memory further stores instructions that further configure the at least one processor to:
when a position of the second controller in the VR space is included in a predetermined range, receive voice data obtained by the first sensor from the second controller, and
control the display based on the received voice data.

13. The electronic device of claim 1, wherein the memory further stores instructions that further configure the at least one processor to, when a distance between the first pointer and the second pointer is less than a threshold, associate data obtained by the first sensor with data obtained by the second sensor and control the display.

14. The electronic device of claim 13, wherein the memory further stores instructions that further configure the at least one processor to control the display to zoom in and display an object on the screen when the distance between the first pointer and the second pointer increases based on the data obtained by the first sensor and the data obtained by the second sensor and to zoom out and display the object on the screen when the distance between the first pointer and the second pointer decreases.

15. The electronic device of claim 13, wherein the memory further stores instructions that further configure the at least one processor to:
identify a third object corresponding to the first pointer and the second pointer among a plurality of objects displayed on the screen, and
control the third object based on data input into the first controller or the second controller.

16. A method for controlling, by an electronic device, a display using a plurality of controllers, the method comprising:
displaying, on a screen, a first pointer for a first controller based on first data obtained by a first sensor of the first controller;
receiving second data obtained by a second sensor of a second controller; and
upon determining that a second pointer for the second controller points at the screen based on the second data while displaying the first pointer for the first controller on the screen, removing the first pointer from the screen and displaying the second pointer for the second controller based on the second data.

17. The method of claim 16, further comprising:
receiving third data input into the second controller; and
controlling a first object on the screen that is selected by the second pointer based on the second data and the third data.

18. The method of claim 16, further comprising:
receiving fourth data input into the first controller; and
when the second pointer for the second controller points at a position outside of the screen, controlling a second object on the screen that is selected by the first pointer based on the first data and the fourth data.

19. The method of claim 18, further comprising:
receiving an input value for a button of the second controller; and
controlling the second object based on the input value, the first data, and the fourth data.

20. A computer-readable recording medium storing instructions configured to perform at least one operation by a processor, the at least one operation comprising:

displaying, on a screen, a first pointer for a first controller based on first data obtained by a first sensor of the first controller;

receiving second data obtained by a second sensor of a second controller; and upon determining that a second pointer for the second controller points at the screen based on the second data while displaying the first pointer for the first controller on the screen, removing the first pointer from the screen and displaying the second pointer for the second controller based on the second data.

* * * * *